United States Patent [19]

Borsari et al.

[11] Patent Number: 5,526,273
[45] Date of Patent: Jun. 11, 1996

[54] APPARATUS FOR MONITORING AND PROGRAMMING FUNCTIONING OF A MACHINE FOR MACHINING WORKPIECES

[75] Inventors: Claudio Borsari, Leontica; Thomas Gasser, Brissago; Lars Olsson, Intragna, all of Switzerland

[73] Assignee: AGIE A.G. Für Industrielle Elektronik, Losone, Switzerland

[21] Appl. No.: 949,547

[22] PCT Filed: Feb. 20, 1991

[86] PCT No.: PCT/EP91/00317

§ 371 Date: Nov. 15, 1993

§ 102(e) Date: Nov. 15, 1993

[87] PCT Pub. No.: WO92/15050

PCT Pub. Date: Sep. 3, 1992

[51] Int. Cl.[6] .................................................... G06F 19/00
[52] U.S. Cl. ............................. 364/474.22; 364/188
[58] Field of Search ................... 364/474.22–474.27, 364/474.04, 188–193

[56] References Cited

U.S. PATENT DOCUMENTS

| 5,043,865 | 8/1991 | Seki et al. | 364/474.22 |
| 5,051,912 | 9/1991 | Johanson et al. | 364/474.04 |
| 5,063,517 | 11/1991 | Seki et al. | 364/474.22 |
| 5,065,332 | 11/1991 | Seki et al. | 364/474.22 |
| 5,113,338 | 5/1992 | Seki et al. | 364/474.22 |
| 5,146,402 | 9/1992 | Seki et al. | 364/474.22 |
| 5,175,407 | 12/1992 | Seki et al. | 364/474.04 |
| 5,177,689 | 1/1993 | Kinasi et al. | 364/474.04 |

*Primary Examiner*—James P. Trammell
*Attorney, Agent, or Firm*—Cohen, Pontani, Lieberman, Pavane; Christa Hildebrand

[57] ABSTRACT

A method of and an apparatus for monitoring and programming functioning of a machine for machining workpieces, in particular, a spark erosion machine, in which separate functions are displayed on a window of the apparatus screen, one or more of the displayed functions is/are selected and then set up valuewise in a further window of the apparatus screen.

13 Claims, 34 Drawing Sheets

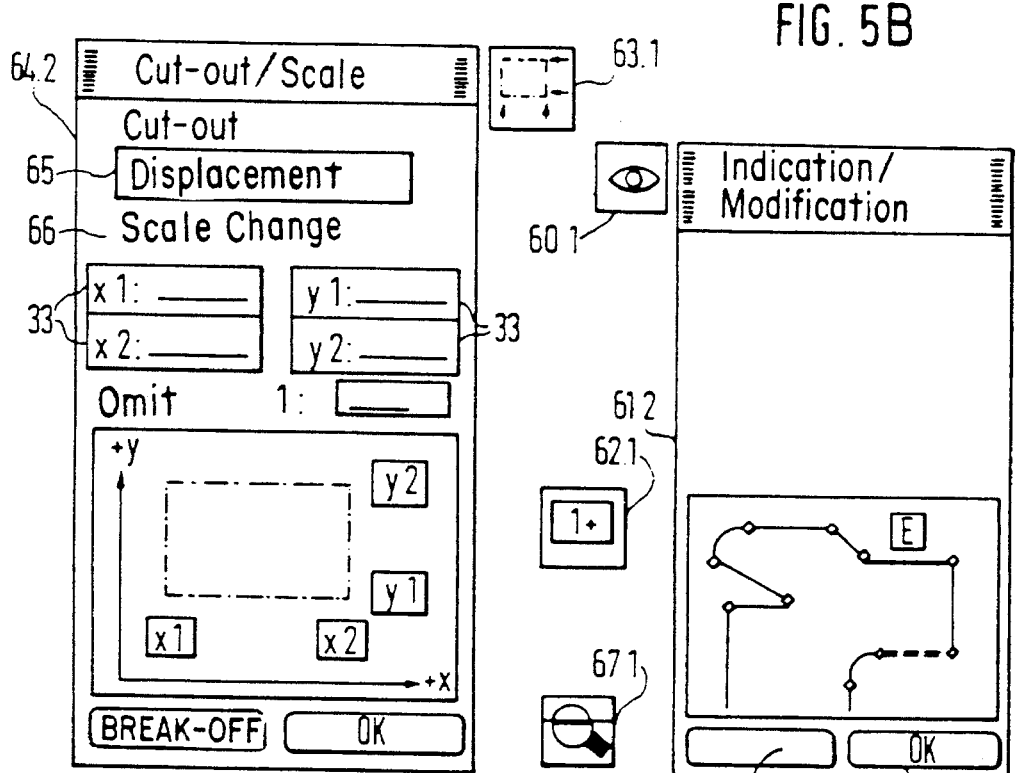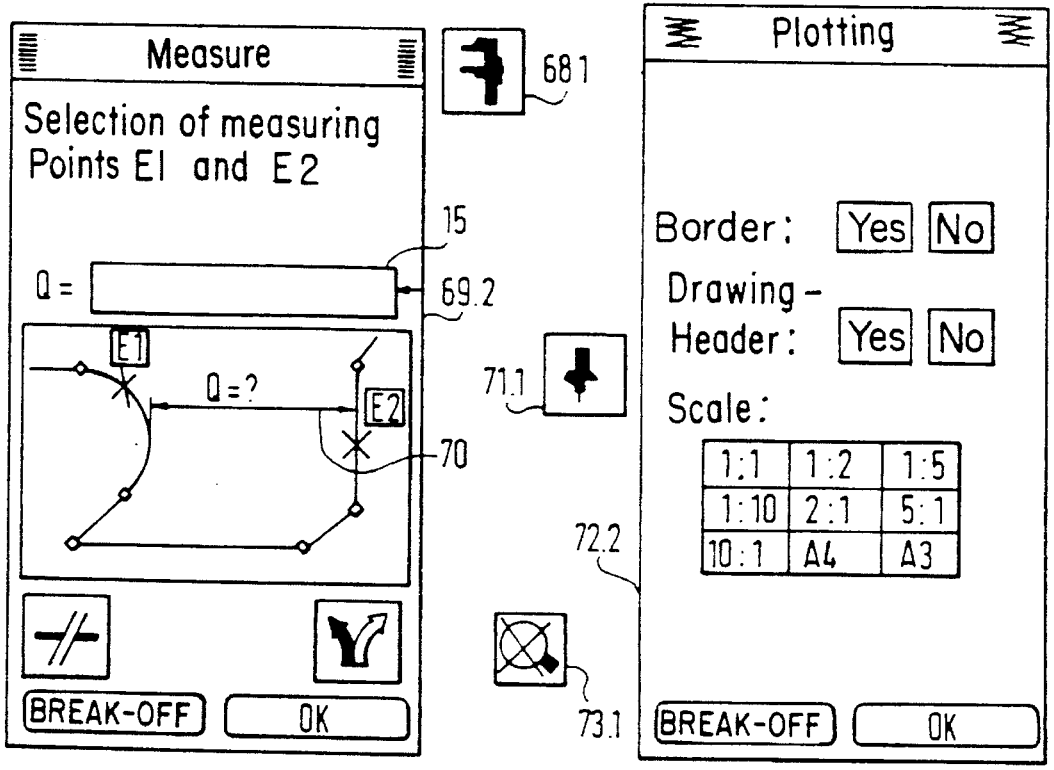
FIG. 5A  FIG. 5B  FIG. 5C  FIG. 5D

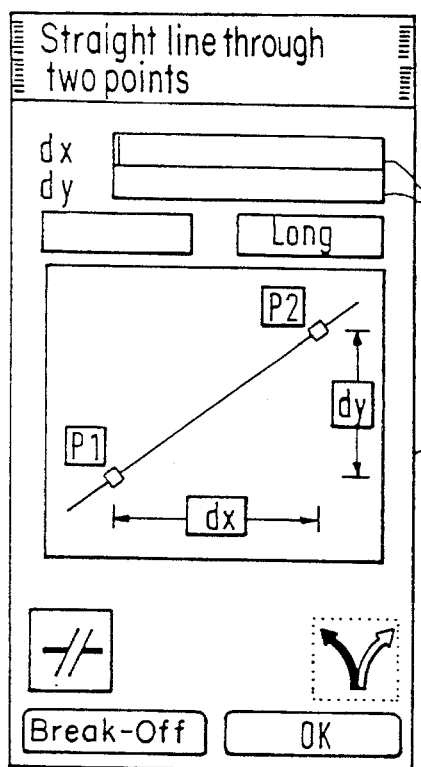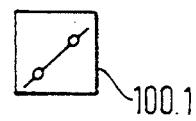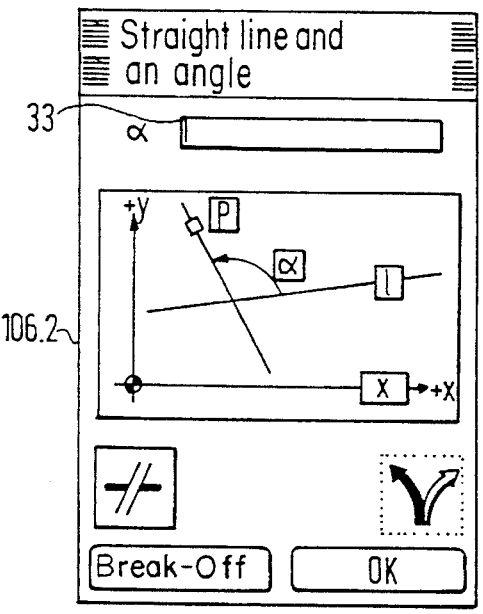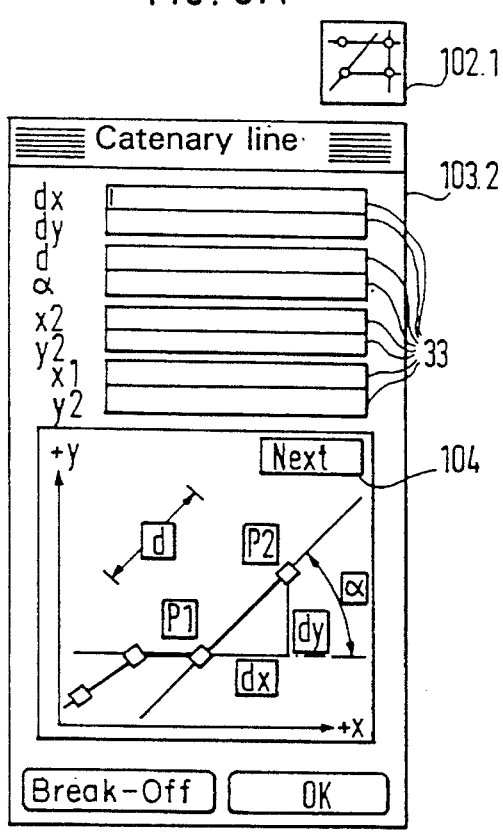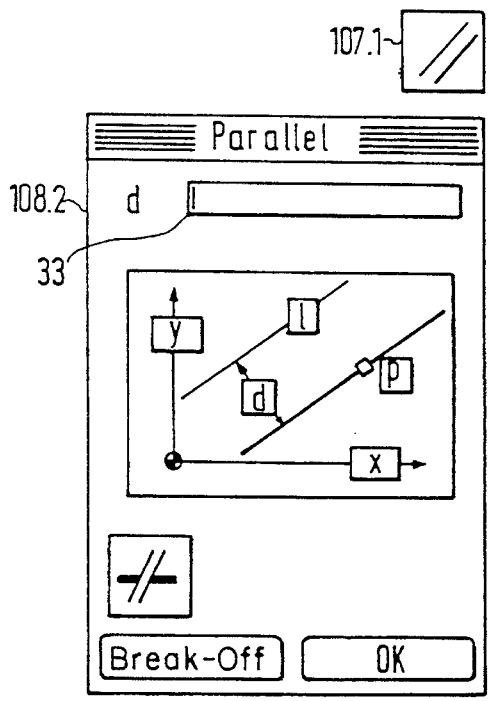
FIG. 8A  FIG. 8B  FIG. 8C  FIG. 8D

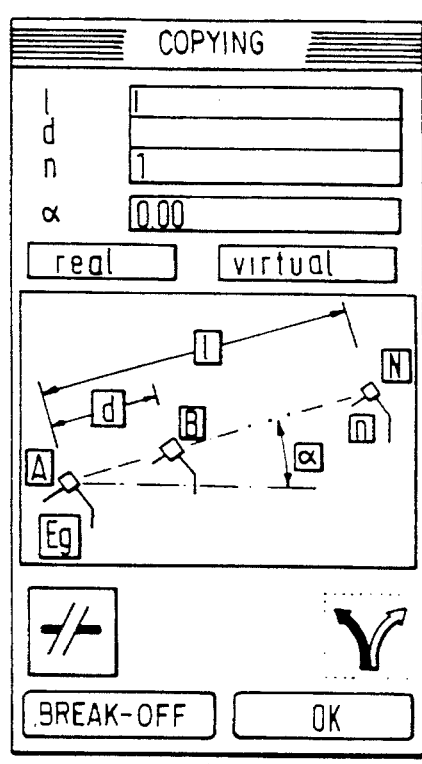
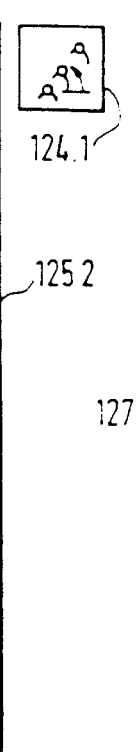
FIG. 10A
FIG. 10B
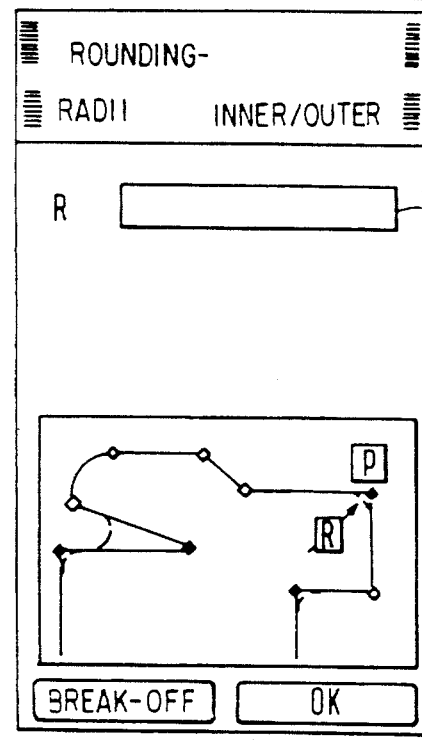
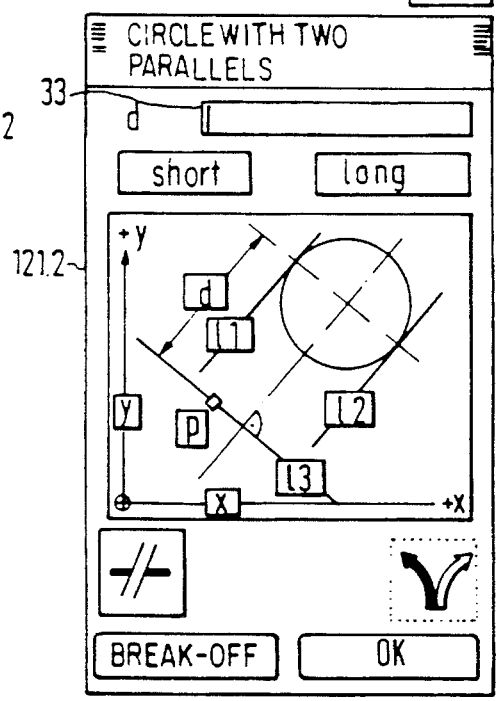
FIG. 10C
FIG. 10D

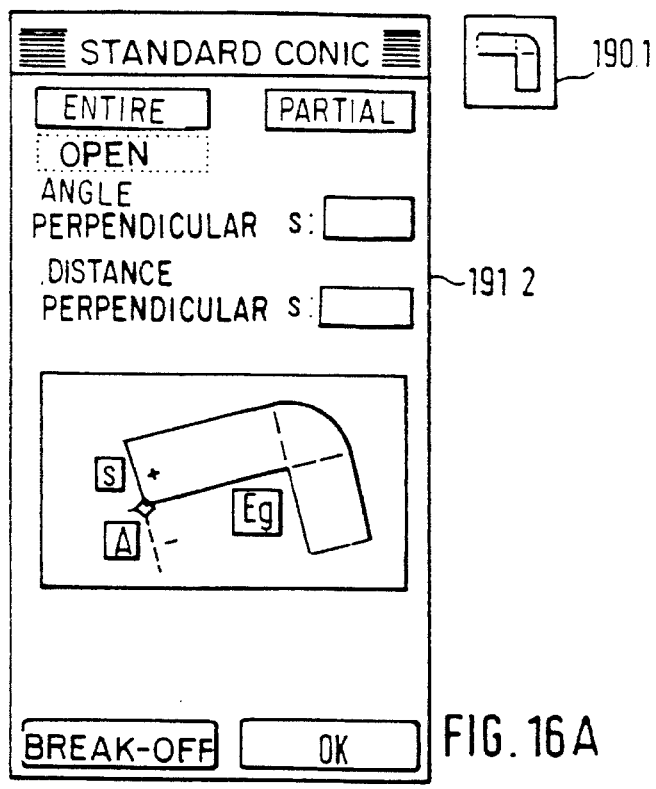
FIG. 16A
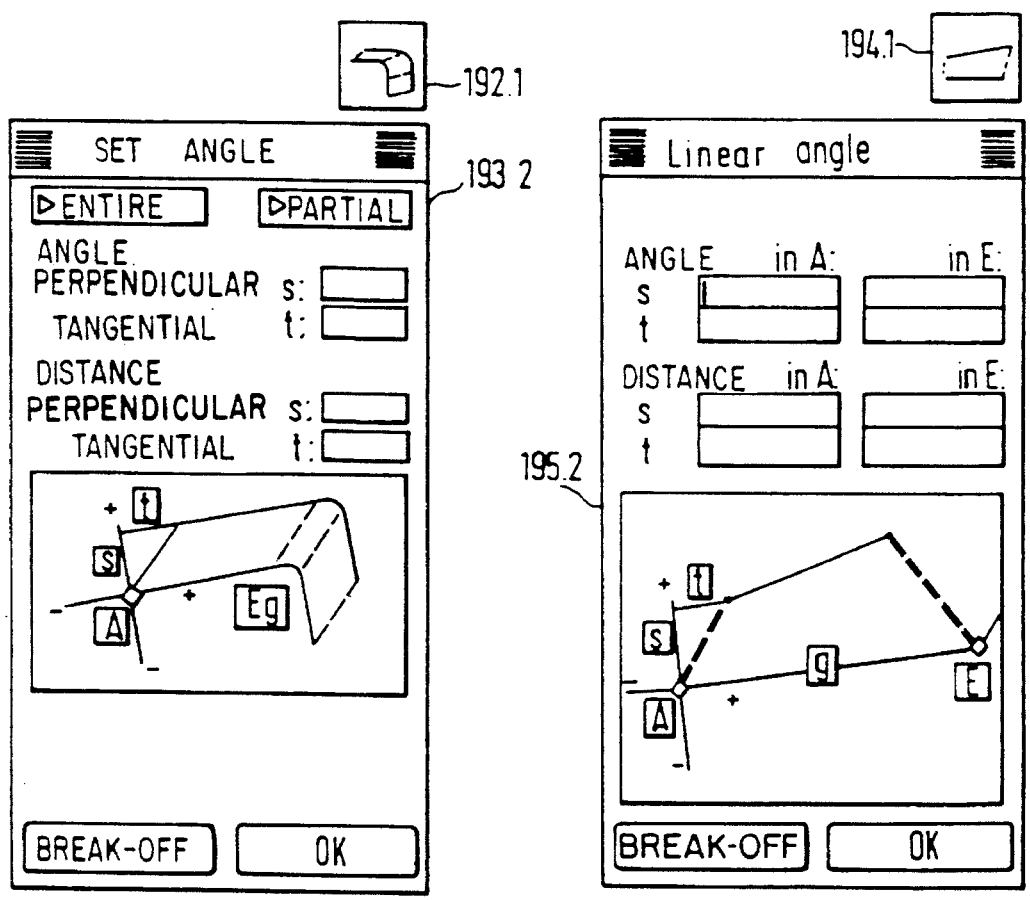
FIG. 16B
FIG. 16C

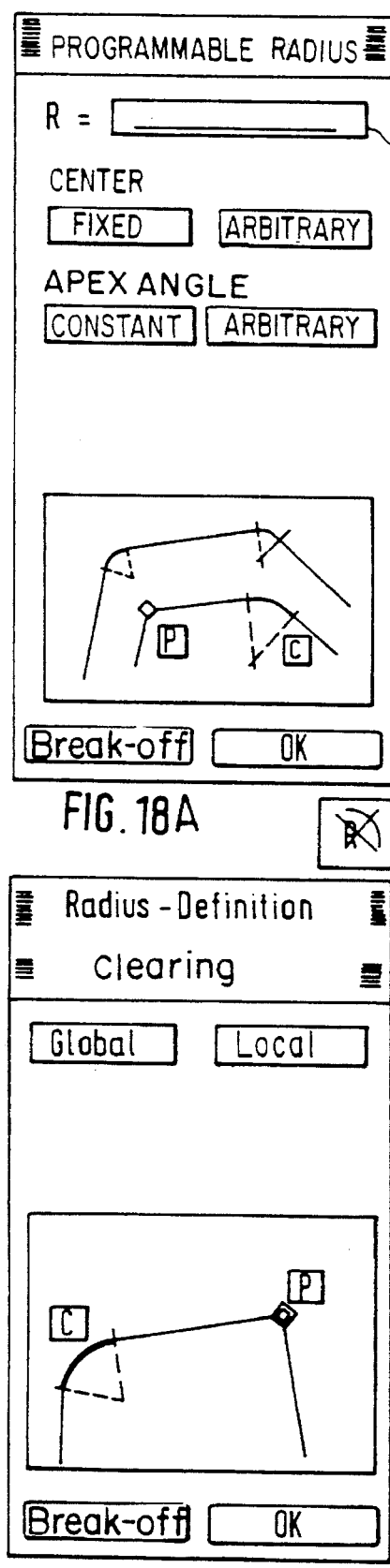
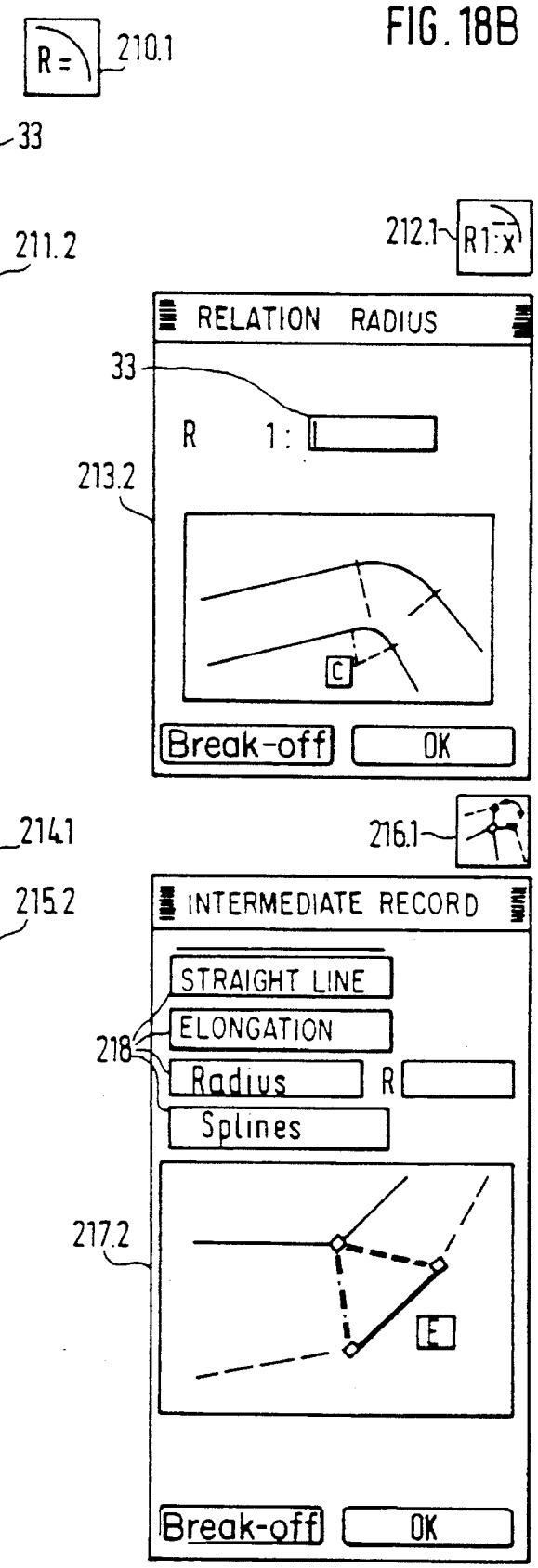
FIG. 18A
FIG. 18B
FIG. 18C
FIG. 18D

FIG. 24A
FIG. 24B
FIG. 24C
FIG. 24D

FIG. 31
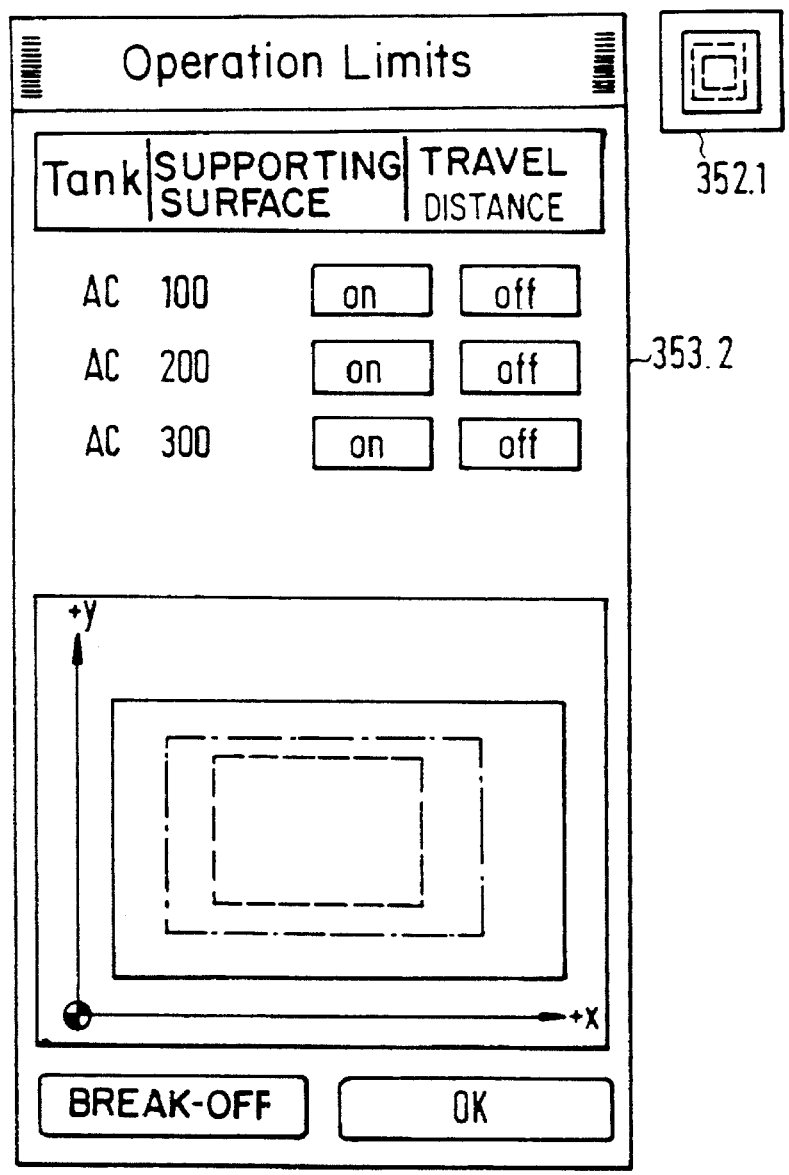
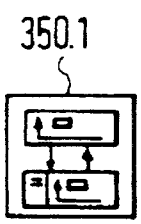
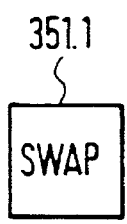

FIG. 33A
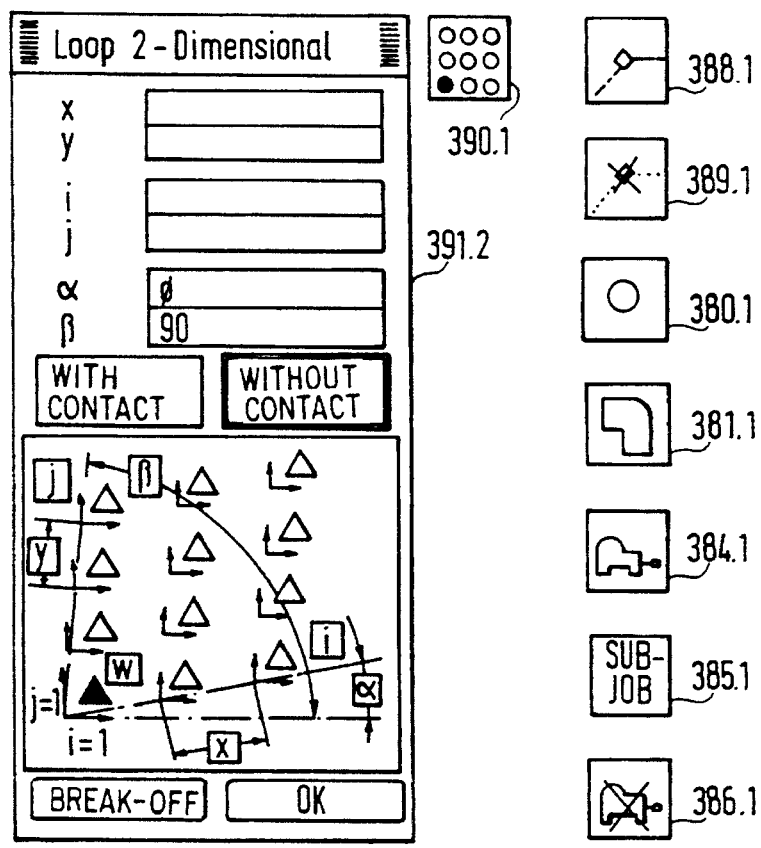
FIG. 33B
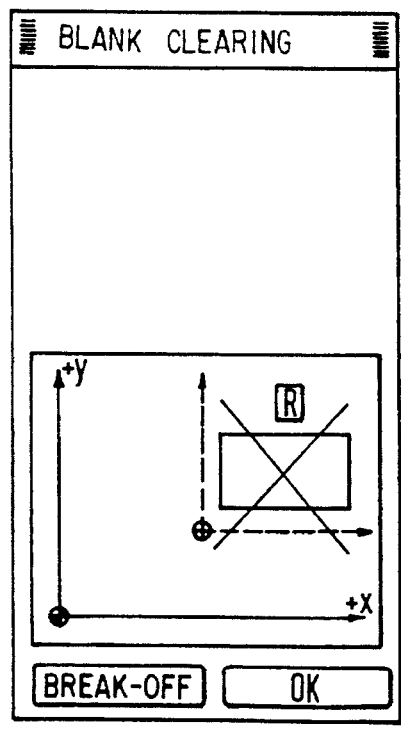
FIG. 33C
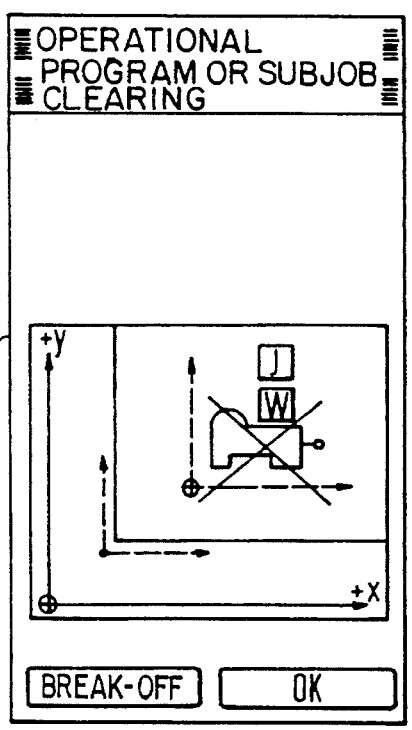

FIG. 34A
FIG. 34B
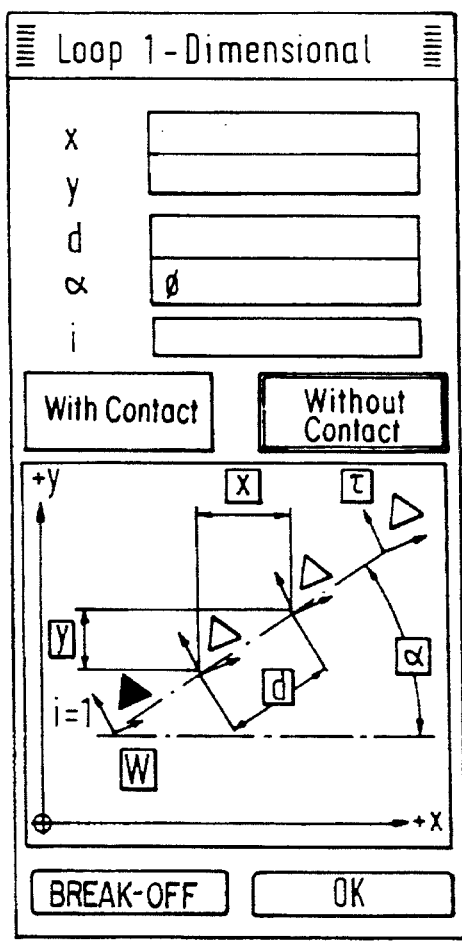
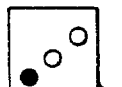
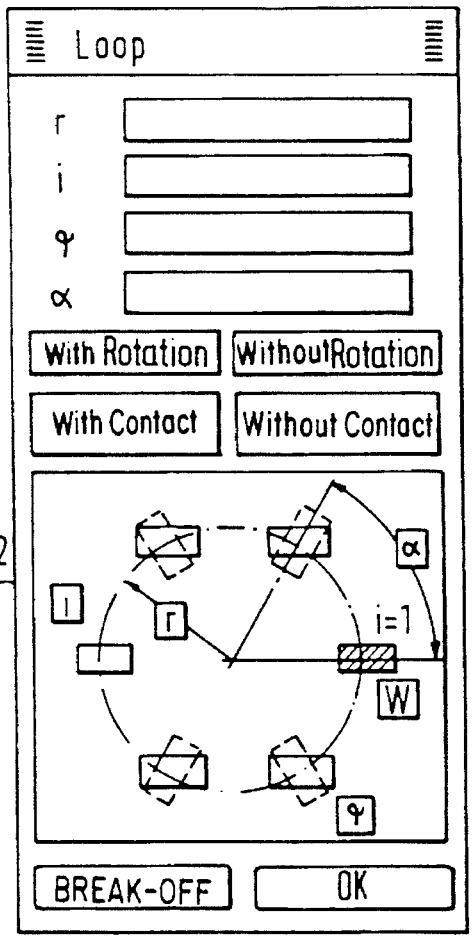
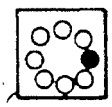

APPARATUS FOR MONITORING AND PROGRAMMING FUNCTIONING OF A MACHINE FOR MACHINING WORKPIECES

BACKGROUND OF THE INVENTION

The invention relates to a method of and an apparatus for monitoring and programming the functioning of a machine for machining workpieces, in particular, a spark erosion machine. The apparatus of the invention is provided with a screen with a window, and the invention also relates to the screen window.

Presently, it is customary to carry out monitoring and programming of the functioning of a machine for machining workpieces by using a control apparatus having a screen with a main window with actual conditions of machining of a workpiece being shown on the window screen. Specifically, with spark erosion machining, defining data such as, e.g., the gap width, tensioning, etc. . . . are flashed on the screen in small value fields. It is further customary, in particular with spark erosion machining, to display on the screen separate points of a profile to be cut in the workpiece in accordance with point inputs. The inputs of the points are effected in accordance with desired movement of the wire electrode. When this technique is used, the user should input, next to a respective point, corresponding directional data. Because of such an input, only a limited dialog between the user and the screen is possible. To be able to verify whether the inputs of predetermined points lead to a desired profile, the user should simulate the complete course of the wire electrode along the profiled section. That is why an initial erroneous input of a cutting direction, e.g., often leads to a non-executable profile. However, finding out that the profile is erroneous occurs at a much later time. Because expenditure of time for input of points based on erroneous data is rather considerable, undesirable dead time results.

SUMMARY OF THE INVENTION

Accordingly, it is an object of the present invention to provide a method and an apparatus for monitoring and programming the functioning of a machine for machining workpieces, so as to improve the dialog between the user and the apparatus.

This and other objects of the invention are achieved by providing a method and an apparatus for monitoring and programming the functioning of a machine for machining workpieces, in which separate functions are displayed, one after another, in the window of the apparatus screen, and one or more of the displayed functions is/are selected, and/or displayed valuewise in a further window of the screen. Thus, selection of a function and its valuewise display can be controlled. In a further embodiment of the invention, the screen window is provided with a window header section for function identification, a window input section for displaying set up values, a window sketch section for displaying and controlling the influence of the set up values on the function, and a key section with which the process of the function set up is broken or interrupted, or the function is transferred to the main window, or constructional alternatives are supplied.

According to an advantageous embodiment of the method of the invention, only executable functions are released for selection, with the corresponding apparatus having means for blocking selection of non-executable functions. Therefore, the user can never select a function which cannot be executed during the course of machine operation. Thus, an erroneous input of a non-executable function, made consciously or unconsciously, is prevented. Advantageously, executable and non-executable functions are distinguished from each other. The apparatus according to the invention includes at least one activating element, preferably provided with identification symbols and associated with the screen window for selecting at least one of the displayed functions. To this end, the activating element is preferably provided with an icon, advantageously, with an icon menu. More preferably, the activating element is provided with means, specifically, a luminous or color defined section, for observable distinction between the executable and non-executable functions. In this case, the user can immediatly recognize which executable functions will be available in the future. Therefore, verification, e.g., with aid of an operational manual, for clarifying relationship of consecutive functions can be reduced to a minimum. The activating element also reduces the dead time of the apparatus and optimizes its utilization.

According to a further advantageous embodiment of the inventive method, the valuewise set up of a function is controlled in a sketch window of the further window of the screen. In the corresponding apparatus, the sketch section has constant figures for reproducing a respective set of functions and symbols or identifiers for reproducing the set up parameters of this function. According to yet another advantageous embodiment of the apparatus of the invention, the sketch section is provided, dependent upon the set up values, with modified figures for displaying the set up or changed values of the function. Thus, the user can see not only the input values. The sketch window simultaneously shows at which location the particular function has been changed by the valuewise set up. Also, input errors are substantially reduced by optical observation.

After its valuewise set up, the function is transferred to the main window of the screen, and the inventive apparatus is provided with means for transferring the selected and, if necessary, set up (valuewise) function to the main window of the screen. In this way, the user knows what has been changed in the structure of the total operation of the machine which is displayed in the main window. Because the valuewise set up has already been satisfactory and repeatedly checked, an erroneous transfer of values to the main window is excluded. Therefore, a simulated test cut, customary in the prior art, can be dispensed with.

In a further embodiment of the method according to the invention, after break off of a valuewise set up of a function, the functions which were originally displayed on the screen window, are again displayed for utilization. Thereby, a new or further function can be immediately selected. Rapid sequence of function transfer during programming of the complete operation is assured.

It is especially preferable to store an actual condition of the further window and call it in at a later time. In the apparatus according to the invention, the screen window is provided with a further element for interrupting the process of setting up a function, and a storage for storing values which were input before interruption. This can be of particular importance when the user interrupts the dialog with the screen, either because the user is occupied with other matters or the user completely finishes the process at the end of a working day, for taking up the process the next working day.

In a more preferred embodiment of the apparatus according to the invention, the screen is provided with at least two windows of which at least one window contains arranged operationally related functions in groups on the basis of the operation or the programmed course. Thereby, a predetermined sequence of functions for machining a workpiece is available to the user. On the basis of this groupping, the user can proceed stepwise when inputting the functions, so that jumping between groups of functions is eliminated. The sequence in which separate steps are set forth is offered by the apparatus itself. Logically incorrect or incomplete data will not be authorized or will be immediately reported to the user by an error message.

In yet another embodiment of the apparatus according to the invention, there are provided at least two screen windows each of which is associated with at least one activating element, advantageously, with at least partially similar identification symbols. By means of these partially similar activating elements, standard functions, common for all operationally related functions, can be triggered. These functions will be discussed later.

In another preferred embodiment of the apparatus according to the invention, the screen window has a function identification section, and/or a section for inputting and setting up a function, and/or a section for sketching a function. The use of such a window minimizes errors during input of values by the user. The identification section enables the user to control if a desired function has been selected after actuation of the activating element. In order to make the identification clear, the identification section is provided, preferably, with display means having definition or symbol means and which identifies a respective selected function. If the desired function is further displayed by using an icon, the user can verify by using, e.g., concrete words or a picture of the icon, whether the desired function has actually been found. The desired function can be made observable in two ways. This permits the exclusion of a possible careless mistake when a function is selected. Simultaneously, the identification section offers the user help in establishing, in response to an inquiry, what meaning each icon has.

In a particularly advantageous embodiment of the inventive apparatus, the input section has a display which reproduces valuewise set up parameters of the selected function. After the identification section identifies the function, a section of the screen window informs the user what actions have been undertaken. Thus, an active dialog between the user and the apparatus, which is not limited to only one section, begins.

In yet a further embodiment of the apparatus according to the invention, several different, mutually exclusive values or value groups, are reproduced, which permit the same modification of an input of a specifically desired function to be obtained. In this way, the user can select which values or value groups appear to be particularly suitable for the intended purpose, or which values or value groups seem to be right for the user personally for conducting the dialog with the apparatus. This is particularly advantageous when the user similar knows only one type of value or value group. Then, the user need not deal with other types of values or value groups with which he is unfamiliar. Likewise, the user can verify what function is obtainable with unfamiliar values or value groups.

More advantageously, the apparatus is provided with means that (simultaneously or sequentially) prevent input of mutually exclusive values or value groups, to eliminate an erroneous input. In order to indicate to the user which value or value group has been just set up, the apparatus is provided, in the input section, with indication means and/or further means for selecting the set-up values or value groups.

Thereby, it is clear to the user which input data can be implemented.

In still another embodiment of the inventive apparatus, there is provided in the input section, for identification of the values or value group corresponding to a respective set up of the function, an illuminated display field with symbols or signs for reproduction of the set up parameters of the function, specifically, a luminously or color defined section. Attention of the user is, thus, unconsciously directed to the display field until the warning process ceases. If the user is still unsure of the response to the question regarding what values can be input, the symbols or signs serve to again provide clarification of the set up parameters of the function.

To reduce the time period for the warning process during input and control of the values effected by the user, the apparatus is provided with, identical symbols and signs in both the input section and the sketch section. The reduction of the warning time period is assigned by the symbols or signs in the sketch section being connected with the display field in the input section that, at the set-up of a predetermined value or value group, so that the warning process is initiated simultaneously in both the sketch section and the input section.

In yet another preferred embodiment of the invention, the screen window has at least two elements for breaking off the process of a function set up and transferring the function onto the main window. Due to the separate arrangement of these breaking off elements, the user can conduct steps separately from each other. The transfer onto the main window is effected, generally, not directly after the set up, but rather the user can, after the break off, one more time verify whether the set up values are acceptable. Only by the next step can the user effect the transfer, after the verification, onto the main window.

The apparatus according to the invention includes means for calling on the stored set up values. Thus, in case of an interruption, the set up process can be again undertaken, without a significant time expenditure.

Finally, in an additional embodiment of the inventive apparatus, there is provided an interpreter for each screen window. Thus, when the screen window is changed, only the file should be changed and not a respective module. Therefore, no new codification is necessary.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 shows a set of icons and corresponding dialog windows related to a second group of functions of the Geometry module;

FIG. 8 shows a set of icons and corresponding dialog windows related to a fifth group of functions of the Geometry module;

FIG. 10 shows a set of icons and corresponding dialog windows related to a seventh group of functions of the Geometry module;

FIG. 13 shows a set of icons and corresponding dialog windows related to a tenth group of functions of the Geometry module;

FIG. 16 shows a set of icons and corresponding dialog windows related to a second group of functions of the angular Conic;

FIG. 18 shows a set of icons and corresponding dialog windows related to a fourth group of functions of the angular Conic;

FIG. 24 shows a set of icons and corresponding dialog windows related to a first group of functions of the Operational Program module;

FIG. 31 shows a set of icons and corresponding dialog windows related to a first group of functions of the Job module;

FIG. 33 shows a set of icons and corresponding dialog windows related to a third group of functions of the Job module; and FIG. 34 shows a set of icons and corresponding dialog windows related to a fourth group of functions of the Job module.

DETAILED DESCRIPTION OF THE PREFERRED EMBODIMENT

Figure 1:
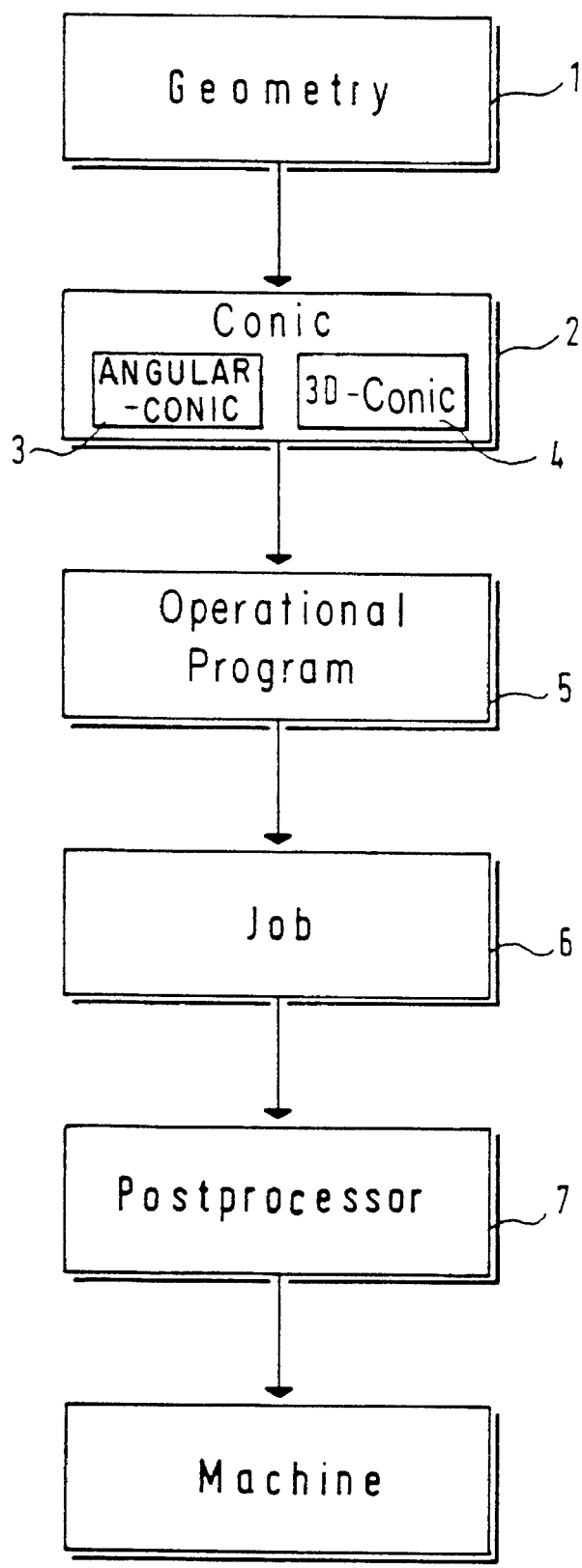
FIG. 1 shows a block diagram of an apparatus for monitoring and programming functions of a machine for producing workpieces, according to the present invention.

On the basis of FIG. 1, the block diagram of an apparatus for monitoring and programming functioning of a machine for machining workpieces according to the present invention will be described with reference to five functional groups (so-called program modules).

Within the bounds of a first, Geometry module, a cut profile is determined, that is, in general, the projection of a machined workpiece. The first Geometry module is designed, in particular, for reading in and preparation of constructional drawings in two dimensions (X/Y plane).

After the cut profile is completely and flawlessly determined and the geometrical data contain no loose elements or fan-outs, the apparatus generates, while storage of the geometrical data takes place, data of the cutting geometry (S-file) and directs the user to a second, Conic module. The Conic structure is based on the cut profile and serves for definition of a body (in three dimensions). In the second, Conic module, the apparatus offers (alternatively) selection of two kinds of definition of the body, with angular Conic 3 and three-dimensional Conic 4 both forming the second, Conic module 2. Within the bounds of the angular Conic 3, the body is described by definition of a second (top) profile on the basis of a given bottom profile (cut profile). This is effected by definition of angles of wire electrode positions at respective points of the cut profile.

Within the bounds of the three-dimensional Conic 4, the body is described by definition of so-called milestones on two previously obtained cut profiles (top and bottom profiles). To this end, the two profiles are so arranged relative to each other that determinant points of the cut (bottom) profile limited by the base surface of the workpiece are associated with corresponding points of the cut (top) profile limited by the top surface of the workpiece. Pairs of associated points of the top and bottom profiles define a single surface line (wire line) of the body. The workpiece itself is defined by data indicating the workpiece material, allowable shape tolerances, the desired roughness of the outer surface of the workpiece, etc. . . .

After the Conic module 2 is completely and flawlessly defined, the apparatus directs the user to a third, Operational Program module 5. Within the bounds of the Operational Program module 5, among others, deviation, start and stop points, turning points, "stops", and corner strategy are defined, and thus "what the machine has to do" to produce the desired workpiece. In the Operational Program module 5, the wire electrode traveling paths are actually generated.

After the Operational Program module 5 is completely and flawlessly defined, the system directs the user to the fourth, Job module 6 (also known as a chain-forming module). With the Job module 6, data for chaining and sequencing the cuts, measuring points, wire cutting points, by-pass points and so forth are generated. Thus, the Job module 6 enables the user to set forth an operational sequence of programs which were completely define in the Operational Program module 5. Thereby, a plurality of operational programs can be so chained that a maximum use of workpiece material, with minimum waste, results.

After the Job module 6 is completely and flawlessly defined, the apparatus directs all the acquired information to a fifth, Postprocessor module 7 which generates a NC-program for a spark erosion machine.

It should also be pointed out that it is possible to input into the apparatus and process therein, geometrical data produced outside the apparatus (e.g., a CAD-program such as AUTOCAD). The dialog between the user and the apparatus takes place by means of a screen and an appropriate input device, advantageously, a mouse and/or a keyboard.

The apparatus provides information of advancing of an operation and presents for selection functions corresponding to a particular operational stage. With the mouse, the user moves an ar-cursor to an object on the screen the user is interested in, and selects or clicks it. With the keyboard, the user can control a so-called scroll bar, input data, and can select displayed elements by their letter or numerical symbols.

Figure 2:
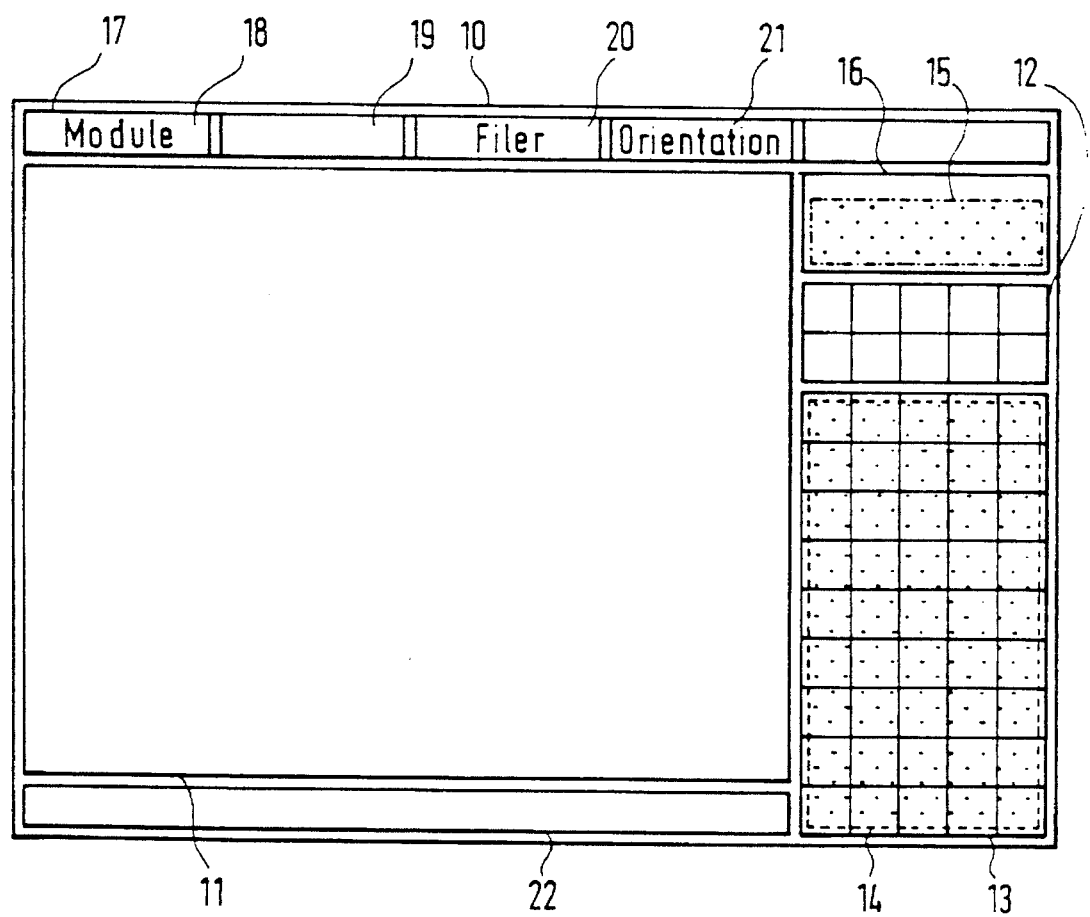
FIG. 2 shows a layout of the screen window of the apparatus according to the present invention.

With reference to FIG. 2, the layout of the screen main window will now be discussed. The main window 10 serves for activization of a module. The main window 10 has two main regions; a graphic region or a graphic window 11 and a function displaying or a function setting region. The latter region supplies tools necessary for operating the machine. The function displaying or the function setting region includes:

- a first icon field 12 which is associated with such functions that essentially relate to each of the above-described modules (so-called "Universal functions");
- a second icon field 13 which is associated with such functions that are essentially referred to a respective active module (so-called "module-referred-to functions");
- a dialog field 14 in which, with selection of a function, a dialog window **\*\*.2 associated with this function, appears via a (separate) icon \*\*.1, likewise associated with this function, and overlaps the second icon field 13**; and
- a measurement field 15 in which, in respective cases, a window with measurement results appears. This measurement field 15 lies in a file name field 16 in which the data, processed at a respective time, appears.

The icon fields 12 and 13 serve for establishing and selecting separate functions. The dialog field 14 serves for setting (e.g., valuewise) each selected function via the dialog window **\*\*.2** associated with the selected function.

In the graphic region or the graphic window 11, the apparatus shows the operational stages and displays elements that are manipulated further with selected functions. Adjacent to the two described main regions, the main window is provided, at its upper edge, also with a (main) menu group 17 and, at its lower edge, with a multi-functional bar 22. The menu group 17 contains a first menu point 18 "Module", a module name field 19, a further menu point 20 "Filer", and a still further menu point 21 "orientation". The user defines a module in which the user will operate by selecting the menu point 18 "Module" from the menu group 17. After that, the apparatus opens a pull-down menu in which the above-described five modules are presented for selection. In the module name field 19, the name of the selected or actual module is shown. When the user selects the menu point 20 "Filer", the apparatus opens another pull-down menu in which functions for processing prepared data or data to be prepared, that is functions for opening, closing, safeguarding, copying, deleting and printing of data, formatting of data carriers, and preparing or deleting of indexes, are presented. When the user selects the menu point 21 "Orientation", a pull-down menu opens by means of which the user can call on information related to the apparatus and its functioning.

The multi-functional bar 22 at the lower edge of the screen window informs the user of related identifications, status (icon switching-on duration), and computating operations, and shows error messages, warnings and so forth.

Figure 3:
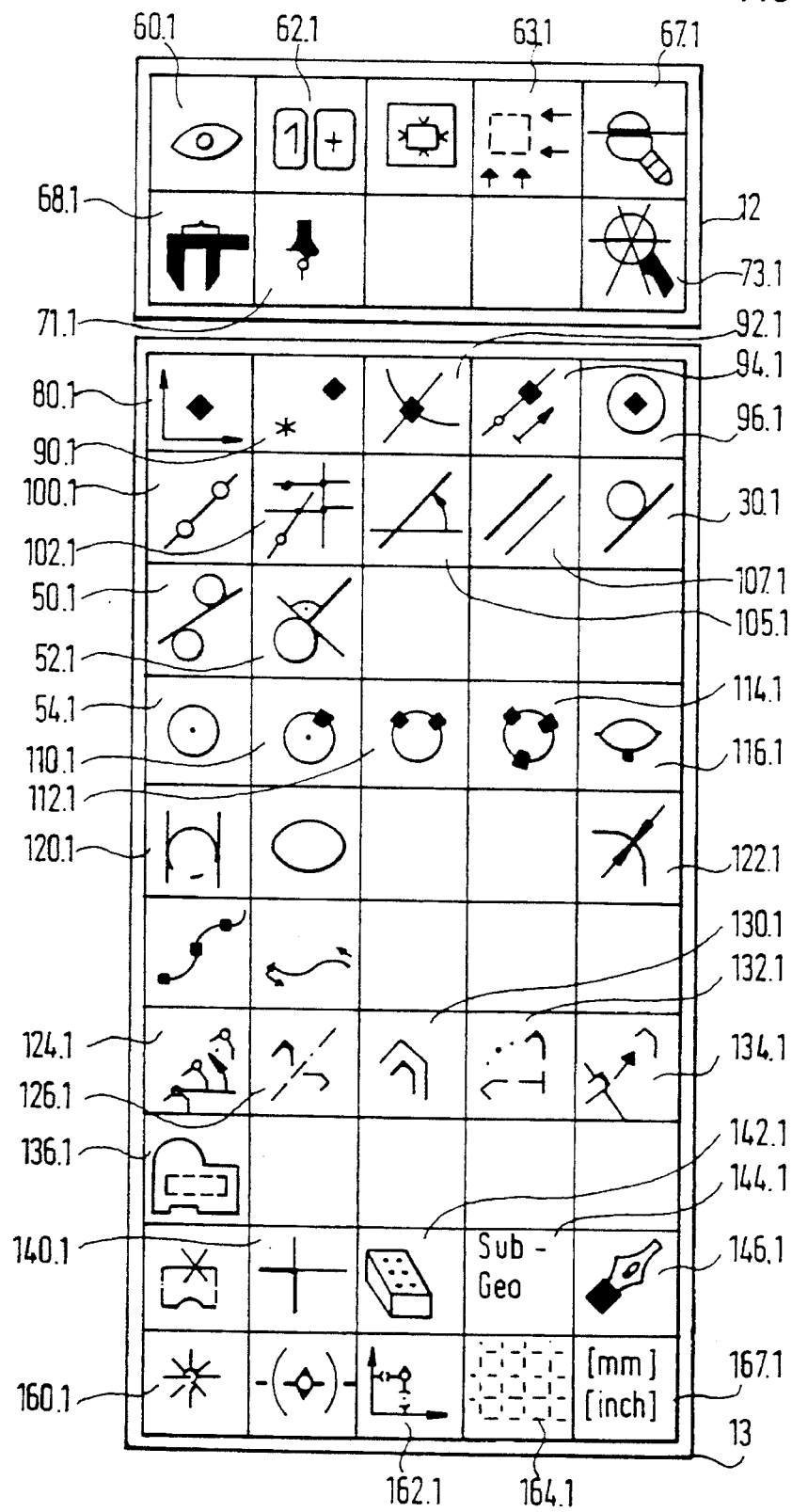
FIG. 3 shows an icon group of the first, Geometry module of the apparatus according to the present invention.
Figure 4A:
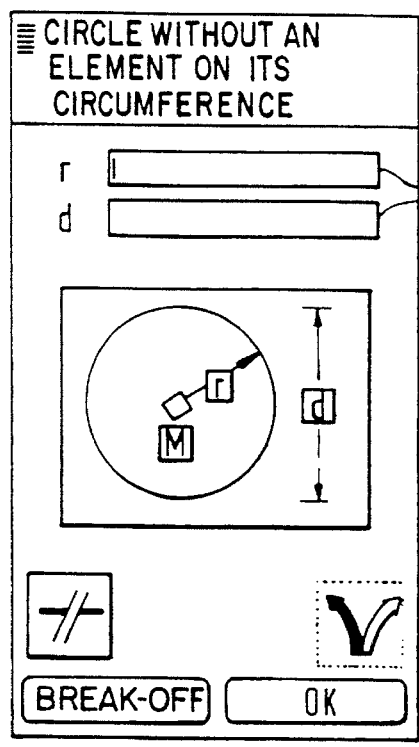
FIG. 4 shows a set of icons and corresponding dialog windows related to a first group of functions of the Geometry module.
Figure 4B:
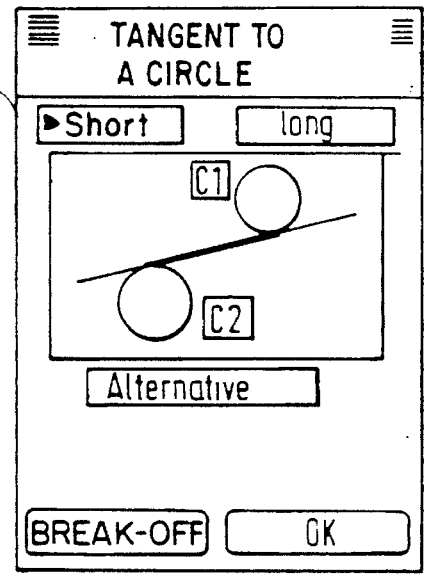
Figure 4C:
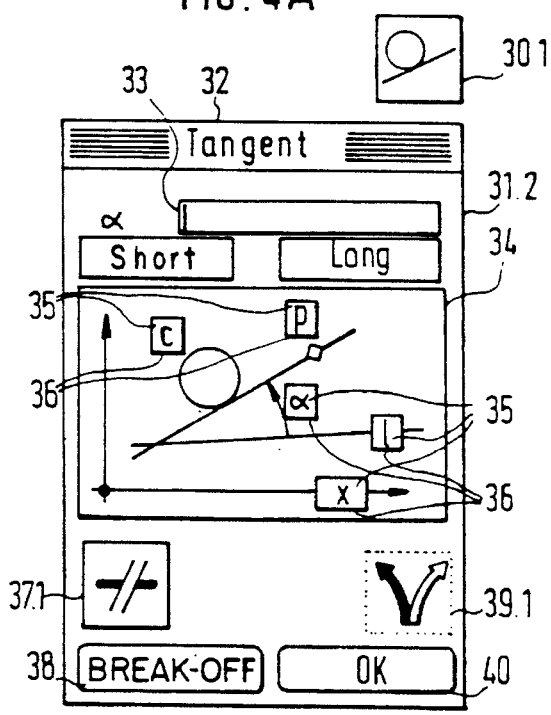
Figure 4D:
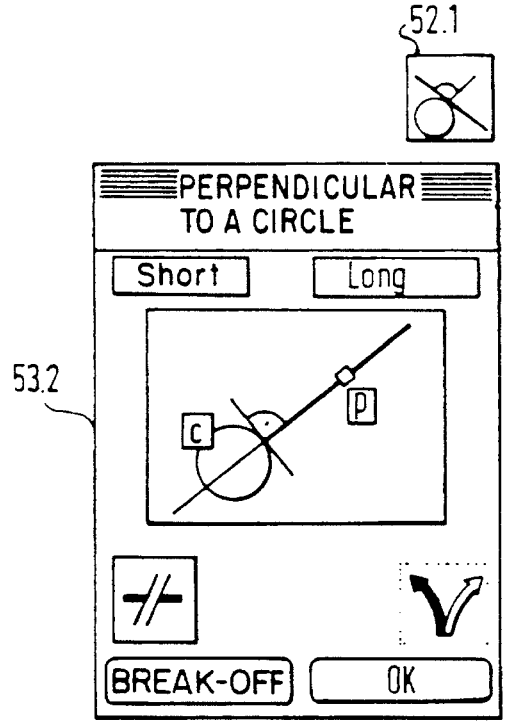

FIG. 3 shows available function selection or function setting range for the Geometry module 1 in the main window 10 which is offered by the apparatus, that is FIG. 3 shows separate icons **\*\*.1 in the icon fields 12 and 13 available in the Geometry module 1. The separate icons \*\*.1 of the first icon field 12 relate to universal functions. The separate icons of the second icon field 13 are associated with particular functions related specifically to the Geometry module 1. When the user selects the Geometry module 1, a window opens in which already prepared cut profile data set appears. The user can call on the already existing data set, or set up a new cut profile. In the first case, the apparatus opens the main window 10 Geometry and, in the second case, also a previous geometry data sheet. In this data sheet, with the keyboard, data such as drawing number, date, author, etc. and comments are supplied, and a measurement unit (mm or inch) is selected. After the data sheet is filled, the main window 10 Geometry appears on the screen. It provides the module name (Geometry) and selected geometrical data, shows, in the graphic region or window 11, an X/Y system of coordinates and, in the function selection region, that is in icon fields 12 and 13, a group of functions associated with this module in the form of an icon group shown in FIG. 3. Each icon \*\*.1 is associated with a respective dialog window \*\*.2 which opens, upon selection of a related icon, in the dialog field 14 and overlaps the icon field 13 of the original icon group. The first icon field 12**, which is reserved for the universal functions, remains visible and selectable.

Now, with reference to FIG. 4, a first group of functions related to the Geometry module 1 and corresponding dialog windows will be discussed. An icon 30.1 (4/5 of the icon group in FIG. 3. Here and in all subsequent description, the first numeral indicates a line and the second numeral indicates a column in a respective icon group) and a dialog window 31.2 relate to a function "Tangent". On the basis of this function "Tangent", by way of an example, for all further functions, a typical course of a dialog between the user and the apparatus will be described in detail.

We will proceed from a premise that the configuration of the cut geometry has already been divided into stages. In the graphic region of the main window, the geometry is already visible as a row of constructional elements, among them a circle and a point can be seen, and the user can draw a tangent to the circle through the point. To this end, the user selects the above-mentioned icon 30.1 and opens thereby the corresponding window 31.2. The dialog window 31.2 has a name 32 identifying the function "Tangent" selected via the icon 30.1 and an input field 33 into which the user can input inquired numerical values or algebraic terms. Further, the dialog window 31.2 shows symbolically, in a sketch field 34, a sketch of the selected function with a plurality of selectable symbolically shown elements 35. The separate elements 35 are enclosed in boxes 36. Additionally, the dialog window 31.2 shows icons or so-called buttons "Interruption" 37, "Break off" 38, (Constructional) "Alternatives" 39 and "OK" 40. (The buttons are graphically shown entry keys that can be actuated with a mouse).

The apparatus expects, in accordance with unambiguous rules, an accurate geometry according to the following constructional principle: Definition of a tangent by a circle K and a point P through which the tangent should extend; or a predetermined straight line and an angle d between the tangent and the predetermined straigt line; or an angle d between the tangent and X-axis of the coordinate system (Alternatives).

Besides, it should be communicated to the apparatus, after the selection of one of the three above-mentioned principles, on which circle and point, or on which straight line among the geometrical elements shown in the graphic region, the user will rely. (Identification). Also, the value of the angle should be communicated to the apparatus in case the tangent is defined by one. The desired value is input into the input field 33 of the dialog window 31.2. In the case discussed here, a constructional principle circle/point is used. This principle the user communicates to the apparatus by selection (and therefore "activation") of elements 35 C and P in respective boxes 36. By selection of respective circles and points, the user communicates to the apparatus on which elements in the graphic region the user relies (identification). Generally, the user can abandon the selection of a constructional principle or "activation" of elements 35 in the sketch field of the dialog window 31.2 and select it directly in the graphic region. The apparatus, thus, makes available automatically a constructional principle to be used.

In case of reliance on an angle, the numerical value, as it has been already indicated, of the angle should be input. A request for such an input will be indicated by a flashing cursor sign in the input field 33.

To prevent overdefinition of a construction, conditions "free", "active", "occupied", or "redundant" are associated with with elements 35, whereby graphic (e.g., colored) changes in corresponding boxes 36 inform the user of the status of elements 35. The apparatus recognizes whether inputs made by the user and referred to the selected function and construction are important and sufficient, and shows it.

The dialog, at each point of the operation, can be interrupted by selection of the corresponding button 37, for example, to open another dialog window. The data, which are processed in the interrupted dialog, meanwhile are stored and, upon closing the selected second dialog window, can be processed further after openning the first dialog window. When the user selects the button "Break off" 38, the dialog window 31.2 closes, and data processed there are cleared. In many dialog windows, there is no sufficient place in the sketch field 34 to cover all (constructional) alternatives. In this case, next to the icon "alternative" 39, the number of alternatives are shown and, if the user selects this icon, the user can make the related alternatives visible one after another in the sketch field 34, and select one of them.

If the process in a dialog window is logically correct and completely finished, the apparatus immediately calculates the new geometrical element (in the example above—the tangent). The user recognizes the logically complete input of data by all the boxes 36 in the input field 33 having either the status "occupied" or "redundant".

During calculation of a new set up element, the cursor takes the form of an egg timer, and the apparatus does not accept any data. After the calculation process is completed, the apparatus awaits acknowledgement of the data in the dialog window from the user by actuation of the "OK" button 40.

To further facilitate the operation, the elements corresponding to each other can be marked with the same color in both the dialog field and the graphic region. Frequently occuring elements or values can be preset. The functions available from the apparatus in their entirety show a large similarity in the design of related associated dialog windows, dialog structures, add logical analysis of input. The above-said follows from the foregoing description of the function "Tangent" and of the other functions and, therefore, need not be repeated in its entirety in the following description.

An icon 50.1 (5/1 of the icon group in FIG. 3) and a dialog window 51.2 relate to a function "Tangent to a Circle". This function serves for drawing a straight line that contacts two given circles. Both circles to be identified.

An icon 52.1 (5/2 of the icon group in FIG. 3) and a dialog window 53.2 relate to a function "A Perpendicular to a Circle". This function serves for drawing a straight line that passes through a given point and intersects the circle in such a manner that it extends perpendicular to a tangent of the circle in the point of contact between the tangent and the circle or in the point of intersection. The respective circle and point need be identified.

An icon 54.1 (6/1 of the icon group in FIG. 3) and a dialog window 55.2 relate to a function "A Circle Without an Element on its Circumference". This function denotes a circle drawn about a given point with either a predetermined radius or having a predetermined diameter. For this function, identification of the point and input of either the predetermined radius or the predetermined diameter into the input field 33 in the dialog window 55.2 are required.

Further, with reference to FIG. 5, a group of second (Universal) functions adressable among others in the Geometry modul 1, and related dialog windows and icons will be described.

An icon 60.1 (1/1 of the icon group in FIG. 3) and a dialog window 61.2 relate to a function Indication/Modification. With this function, an identified element can be indicated and, eventually, modified. The manipulated element must be identified in the graphic region (e.g., with a click). The elements "Parents/Children/Childrens' children" will first be, according to predetermined rules, highlighted in the graphic region. Upon actuation of the button 40 "OK", for definition of elements, the utilized window opens and, simultaneously, elements connected with the identified element are denoted with a particular color.

An icon 62.1 (1/2 of the icon group in FIG. 3) relates to a function "Arithmetic Operation". This function enables the user to calculate with basic operators: plus, minus, multiply, and divide by;

mathematical functions: sin, cos, tan, arcsin, arccos, and arctan, and thereby permits setting of clips.

An icon 63.1 (1.4 of the icon group in FIG. 3) and a dialog window 64.2 relate to a function "Cut-out/Scale". With this function, the user can, after selection, define an option "Displacement" 65, starting and finishing points of a predetermined cut-out displacement. The cursor sign, during establishing of displacement vectors, takes a form of a cross;

utilize an option "Scale Modification 66 of increasing or decreasing the cut-out. Increase or decrease can be effected in the corresponding input field 33 either by inputting a predetermined edge value with regard to the X- or Y-axis, or by inputting an appropriate coefficient. The available graphic region is thus always optimally utilized.

An icon 67.1 (1/5 of the icon group in FIG. 3) relates to a function "Zooming". This function serves for increasing or decreasing a detail of an image. When this function is selected, the cursor sign takes the form of a cross. By clicking a point and a diagonal "Draw", with actuated mouse, a rectangle limiting a predetermined image area is defined. Upon mouse release, the selected image area is increased to the complete dimension of the screen. (This function is not associated with any dialog window).

An icon 68.1 (2.1 of the icon group in FIG. 3) and a dialog window 69.2 relate to a function "measurement". A measurement result appears in the measurement field 15 of the dialog window 69.2. The apparatus then draws a particular gauge mark 70 in the measurement section.

The following measurement can be taken:

a distance between two parallel straight lines;

a distance between two circles in dependence on click location;

a distance between two points;

a distance between a point and a straight line;

a distance between a point and a circle in dependence on click location;

a distance between a straight line and a circle in dependence on click location;

a circle diameter; and an angle between two non-parallel straight lines.

The respective measurement follows after a simple click of respective geometrical elements.

When the function "Measurement" is called on with another dialog window being open (after clicking the button 37 "Interruption"), the measurement result is transferred into an input bar of a first dialog window if this input bar was previously set as "active".

An icon 71.1 (2/2 of the icon group in FIG. 3) and a dialog window 72.2 relate to a function "Plotting". This function permits the showing of an actual condition of a graphic image with a plotter so that during plotting the function can further be worked on. The dialog window permits arrangement of a drawing frame, a drawing header, and different scales.

An icon 73.1 (5/5 of the icon group in FIG. 3) relates to a function "Zooming Canceled".

Figure 6:
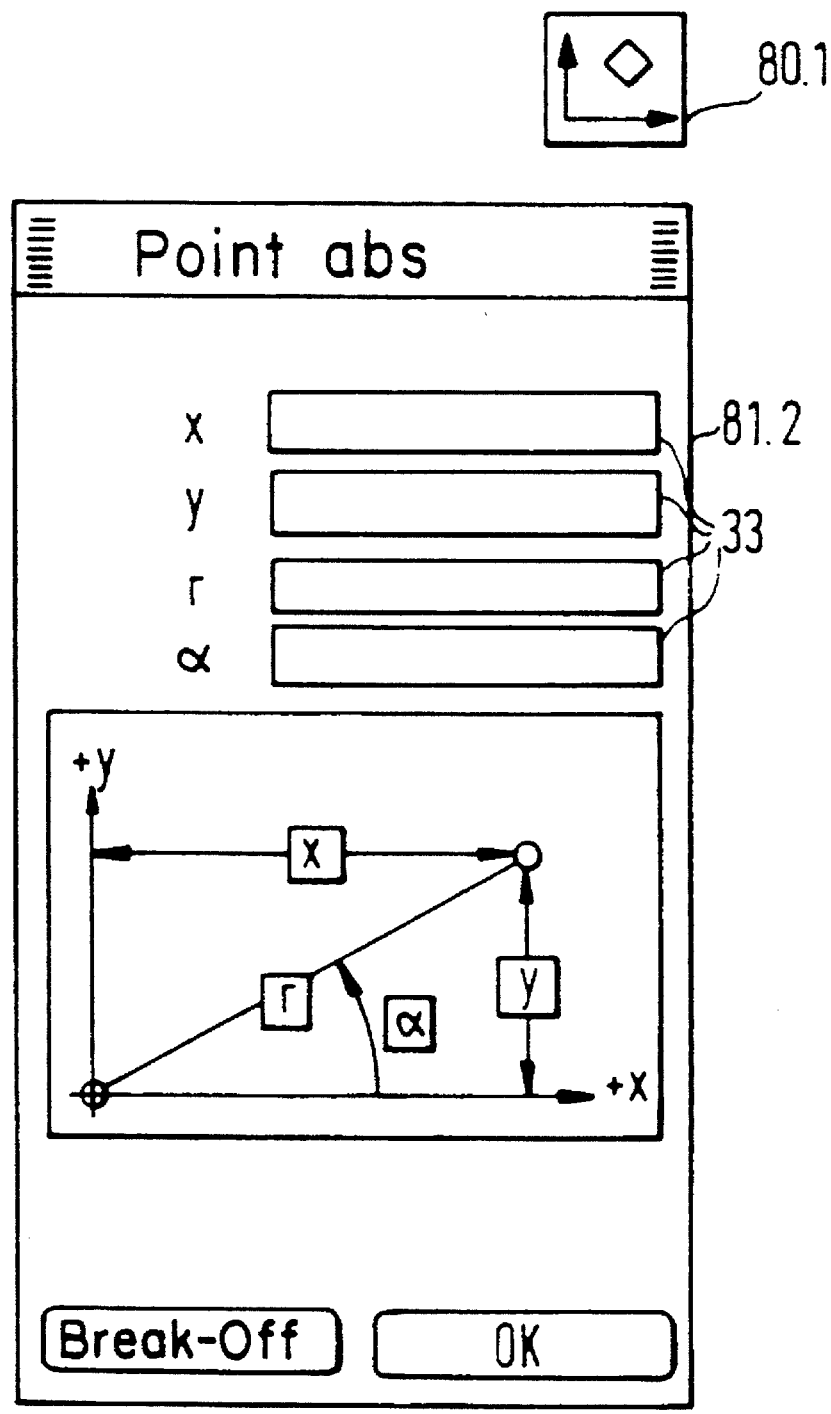
FIG. 6 shows a set of icons and corresponding dialog windows related to a third group of functions of the Geometry module.
Figure 7A:
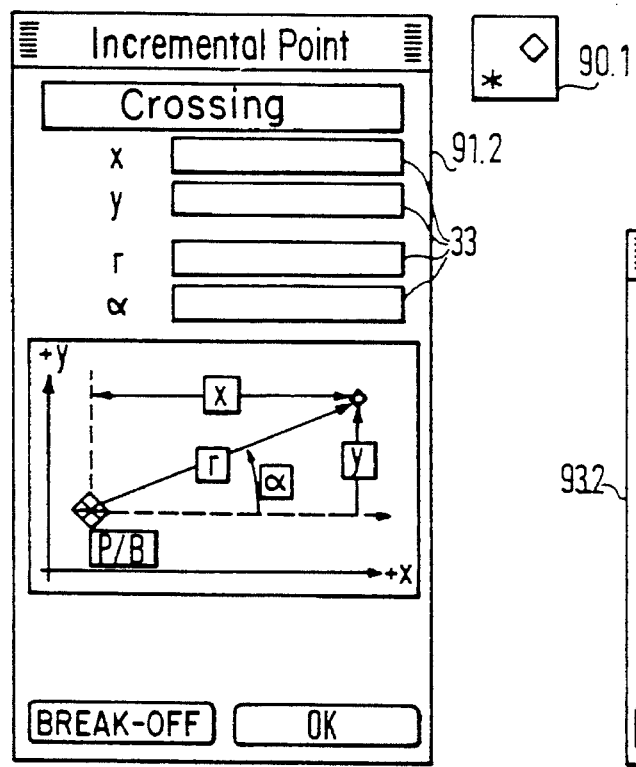
FIG. 7 shows a set of icons and corresponding dialog windows related to a fourth group of functions of the Geometry module.
Figure 7B:
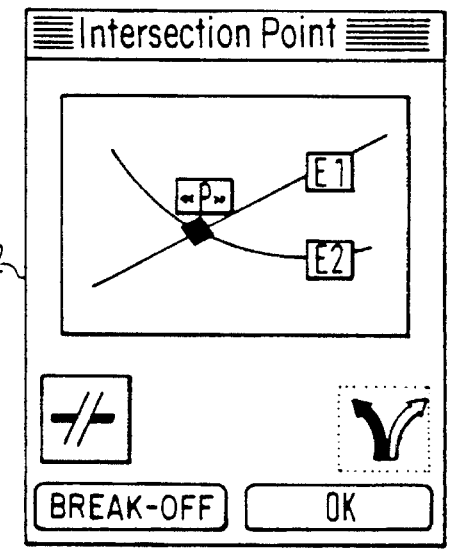
Figure 7C:
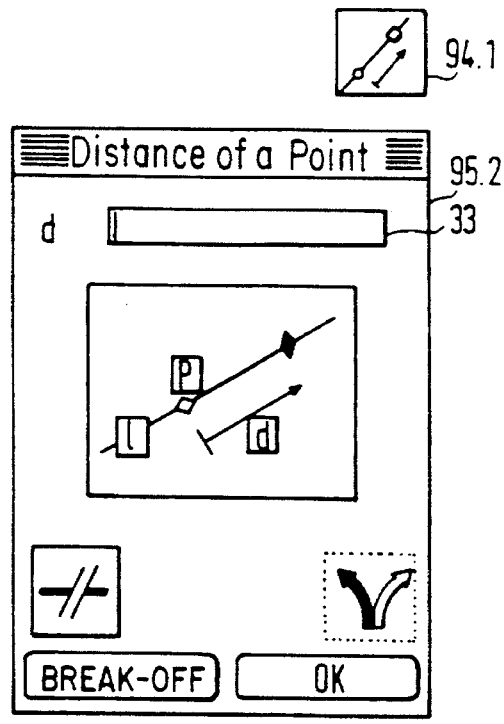
Figure 7D:
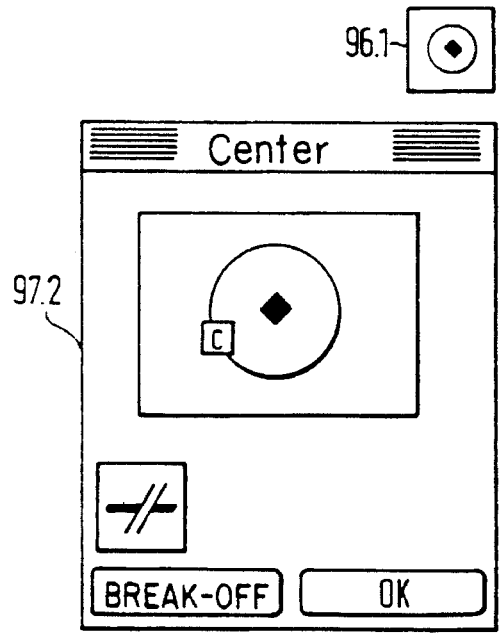
Figure 9A:
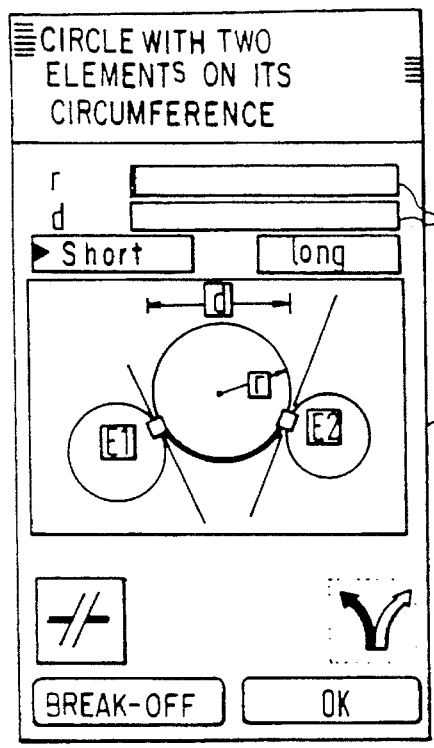
FIG. 9 shows a set of icons and corresponding dialog windows related to a sixth group of functions of the Geometry module.
Figure 9B:
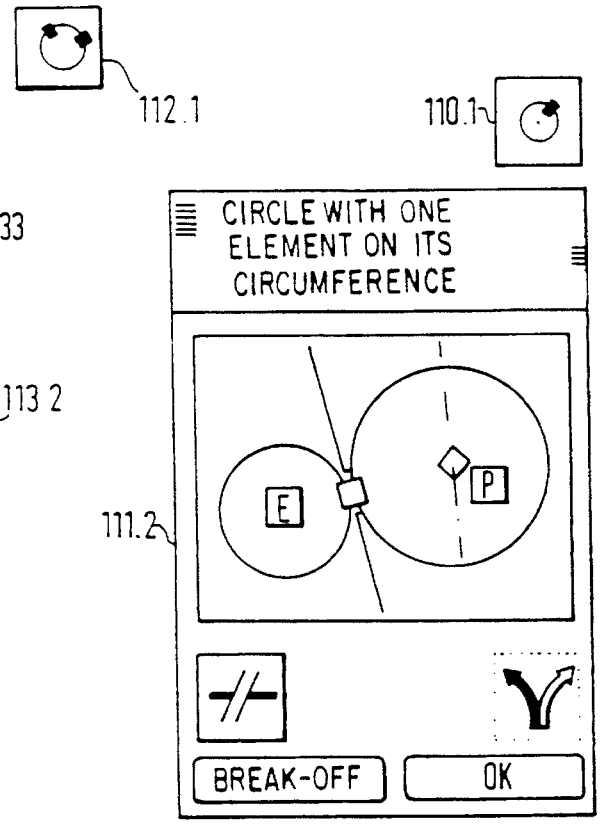
Figure 9C:
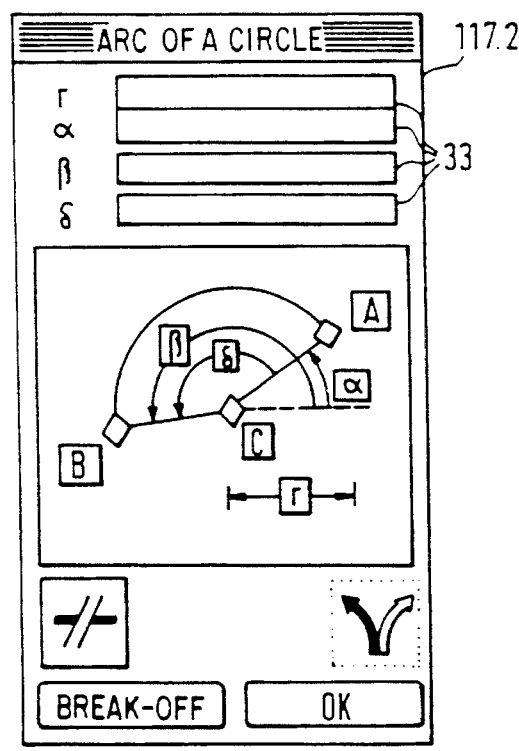
Figure 9D:
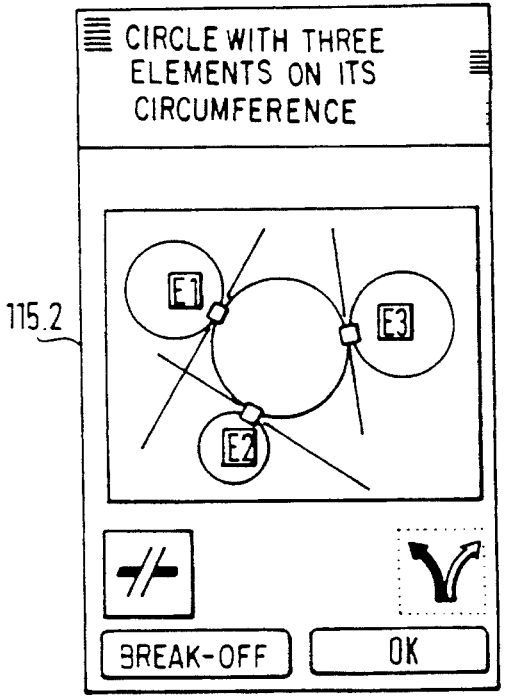
Figure 11A:
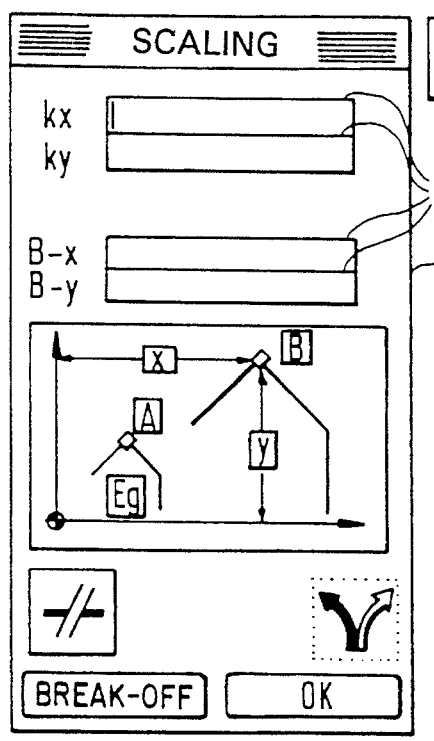
FIG. 11 shows a set of icons and corresponding dialog windows related to an eighth group of functions of the Geometry module.
Figure 11B:
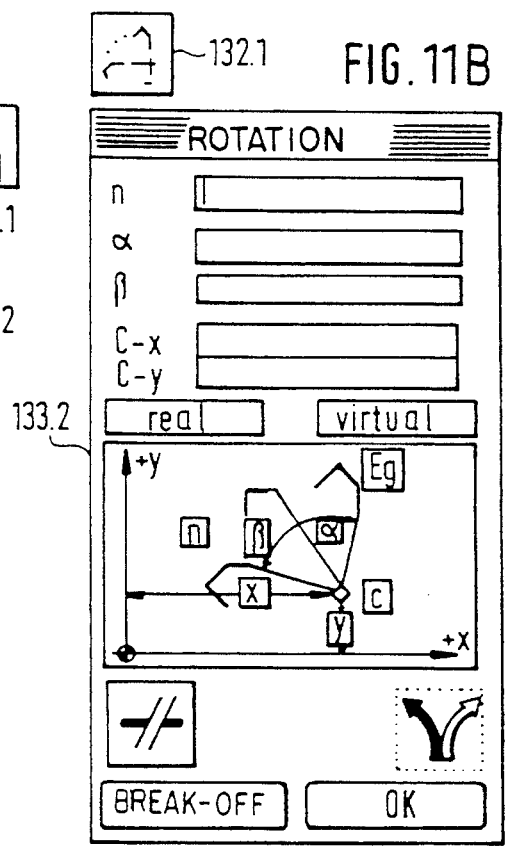
Figure 11C:
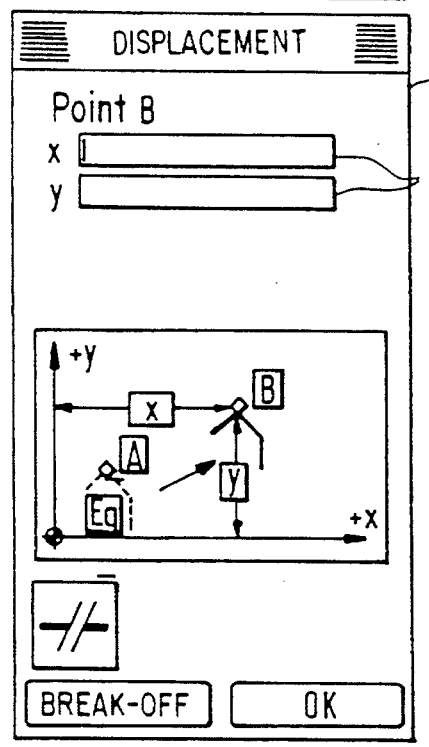
Figure 11D:
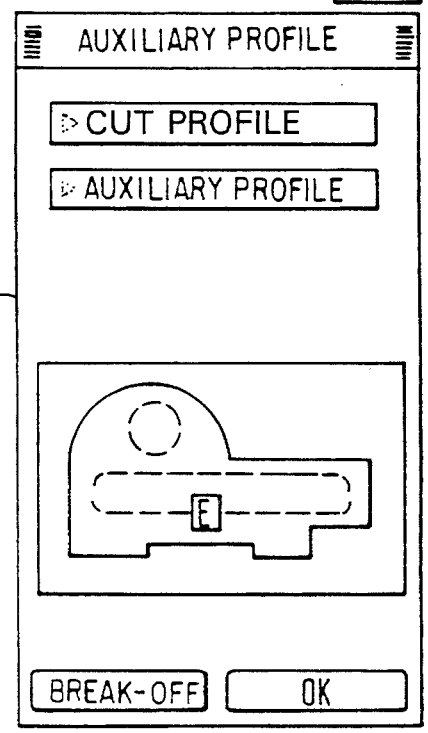
Figure 12A:
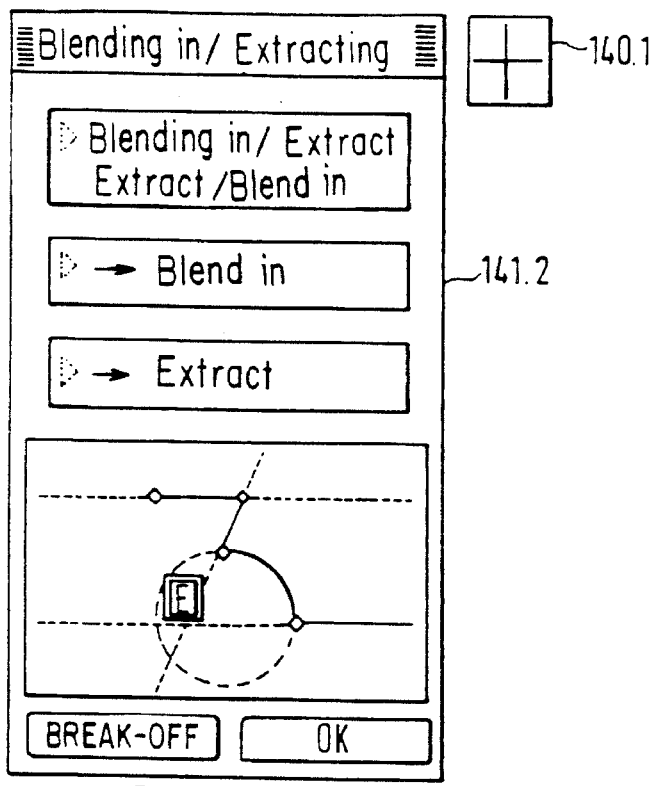
FIG. 12 shows a set of icons and corresponding dialog windows related to a ninth group of functions of the Geometry module.
Figure 12B:
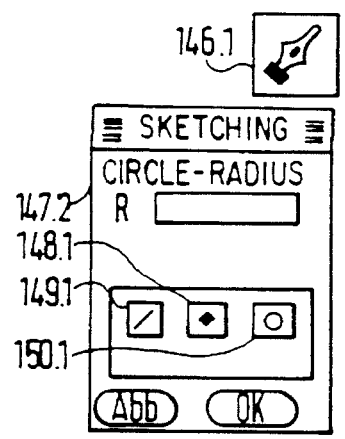
Figure 12C:
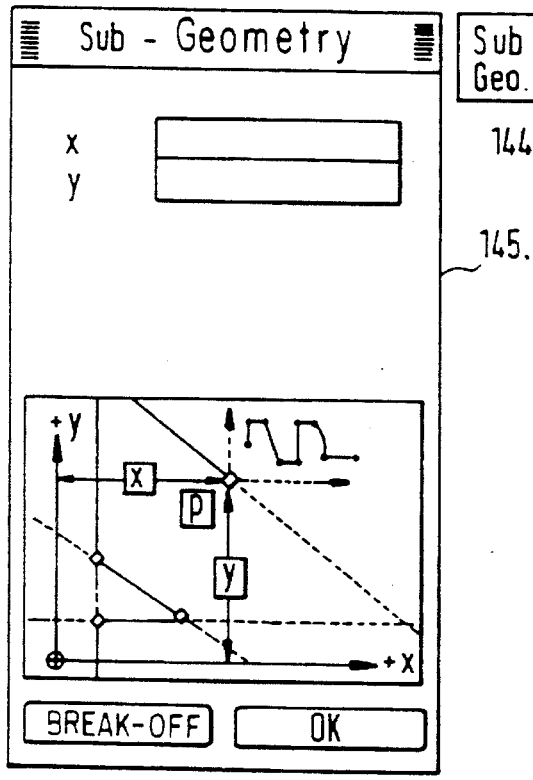
Figure 12D:
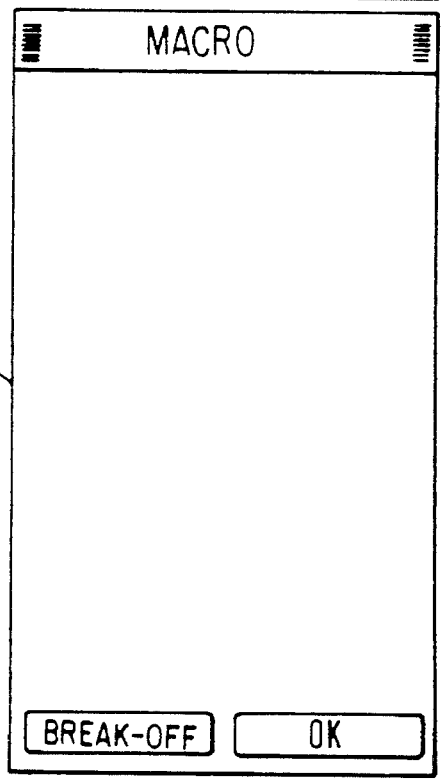

Now, with reference to FIG. 6, an icon and a dialog window related to a third, special function of the Geometry module 1 will be described. An icon 80.1 (3/1 of the icon group in FIG. 3) and a dialog window 81.2 relate to a function "absolute Point". This function serves for defining a point through its absolute cartesian coordinates (preset) or its polar coordinates. The user then transfers the desired value to a corresponding input field 33.

Below, with reference to FIG. 7, a fourth group of (special) functions and respective icons and dialog windows related to the Geometry module 1 will be described.

An icon 90.1 (3/2 of the icon group in FIG. 3) and a dialog window 91.2 relate to a function "Incremental Point". This function serves for defining a second point through its cartesian or polar incremental values referred to a clicked first point. To this end, the user transfers the desired values to a coreponding input field 33.

An icon 92.1 (3/3 of the icon group in FIG. 3) and a dialog window 93.2 relate to a function "Intersection Point". This function serves for defining an intersection point of two elements E1 and E2 or an already given point, which lies in the vicinity of the intersection point, as a new element.

An icon 94.1 (3/4 of the icon group in FIG. 3) and a dialog window 95.2 relate to a function "Distance of a Point". This function serves for defining a second point on an element 1 through a desired distance d from a first point P on the same element 1. To this end, the user, along with the identification, should input the desired distance d into the input field 33.

An icon 96.1 (3/5 of the icon group in FIG. 3) and a dialog window 97.2 relate to a function "Center". This function serves for defining a center of a circle as a new element.

Now, with reference to FIG. 8. a fifth group of functions and corresponding icons and dialog windows related to the Geometry module 1 will be described.

An icon 100.1 (4/1 of the icon group in FIG. 3) and a dialog window 101.2 relate to a function "Straight Line through Two Points". This function serves for defining a straight line through given first and second points as a new element. The second point can be already given or defined anew. In the later case, along with identification, an input of coordinates of derivative dx and dy of both points into the input field 33 is required.

An icon 102.1 (4/2 of the icon group in FIG. 3) and a dialog window 103.2 relate to a function "Cartenarian Line". This function serves for connecting to each other a plurality of straight lines to form a chain. At a preliminary end point of the chain, after selection of an option "Next" 104, identification of a next carterian point is required for its connection with the preliminary end point of the chain. If there is no next end point, an input of its coordinates (absolute or incremental, cartesian or polar) into the input field 33 is required.

An icon 105.1 (4/3 of the icon group in FIG. 3) and a dialog window 106.2 relate to a function "Straight Line and an Angle". This function serves for drawing a straight line through a given point at a predetermined angle to a reference line. As the reference line, the X-axis can be used. To this end, the predetermined angle should be input into the input field 33.

An icon 107.1 (4/4 of the icon group in FIG. 3) and a dialog window 108.2 relate to a function "parallel". This function serves for drawing, parallel to a given reference straight line, a straight line that either passes through a given point or extends at a predetermined distance from the reference line. As a reference line, either of the both axes can be used. For the function Parallel identification of the reference line is needed, which, as has already been indicated, can be any of the two axes, and either identification of the point through which the drawn line should pass; or input of the desired distance of the parallel from the reference line into the input field 33.

Below, with reference to FIG. 9, a sixth group of functions and corresponding icons and dialog windows related to the Geometry module 1 will be described.

An icon 110.1 (6/2 of the icon group in FIG. 3) and a dialog window 111.2 relate to a function "Circle with One Element on its Circumference". This function provides for drawing a circle about a given point so that its circumference contacts or passes through a second given element. The second element can be a straight line, another circle, or a point. For this function, identification of a point selected as a center of the drawn circle and identification of the straight line, the other circle, or the other point, which would contact the drawn circle or (when the geometrical element is point) pass through it, is required.

An icon 112.1 (6/3 of the icon group in FIG. 3) and a dialog window 113.2 relate to a function "Circle with Two elements on its Circumference". This function provides for obtaining a circle having either a given radius or a given diameter and whose circumference has a common point with each of two given geometrical elements. Each of the two geometrical elements can be, independent from each other, a straight line, a circle, or a point. For this function identification is needed of both geometrical elements which the drawn circle contacts or (when a geometrical element is a point) passes through. Also, either the radius or the diameter should be input into the input field 33 of the dialog window 113.2.

An icon 114.1 (6/4 of the icon group in FIG. 3) and a dialog window 115.2 relate to a function "Circle with Three Elements on its Circumference". This function provides for drawing a circle having a common point with each of three given geometrical elements. Each of the three given geometrical elements can be independent from two other elements, a straight line, a circle, or a point. For this function identification is needed of the three geometrical elements which the drawn circle contacts or (when a geometrical element is a point) passes through.

An icon 116.1 (6/5 of the icon group in FIG. 3) and a dialog window 117.2 relate to a function "Arc of a Circle". This function provides for drawing an arc of a circle. To this end, the following is required:

identification of two given points as a start point and an end point of the arc and input of the desired radius of the arc into the input field 33 of the dialog window 117.2; or identification of two given points as a start point and a midpoint of the arc and input, into the input field 33 of the dialog window 117.2, of a value which indicates a desired angle between the positive X-axis and the line connecting the midpoint and the end point of the arc; or identification of a given point as a midpoint of the arc and input, into the input field 33 of the dialog window 117.2, of the arc radius and two values, of which the first value indicates a desired angle between the position X-axis and the line connecting the midpoint and the start point of the arc, and the second value indicates a desired angle between the line connecting the midpoint and the start point of the arc and the line connecting the midpoint and the end point of the arc; or identification of a given point as a midpoint of the arc and input, in to the input field 33 of the dialog window 117.2, of the arc radius and two values of which the first value indicates a desired angle between the positive X-axis and the line connecting the start point and the midpoint of the arc, and the second value indicates a desired angle between the positive X-axis and the line connecting the midpoint and the end point of the arc.

Now, with reference to FIG. 10, a seventh group of functions and corresponding icons and dialog windows related to the Geometry module 1 will be described.

An icon 120.1 (7/1 of the icon group in FIG. 3) and a dialog window 121.2 relate to a function "Circle and Two Parallels". This function provides for drawing of a circle containing two given parallels and whose diameter extending perpendicular to the two parallels is spaced from a third given element a selectable distance. The third element can be either a point, or a straight line perpendicular to the two parallels, or one of the two coordinate axes. For this function, identification of both parallels and the third element and input of the selectable distance into the input field 33 of the dialog window 121.2 is required.

An icon 122.1 (7/5 of the icon group in FIG. 3) and a dialog window 123.2 relate to a function "Rounding—Radii Inner/Outer". This function provides for rounding of a corner in a prepared profile. To this end, identification of the roundable corner point and input, into the input field 33 of the dialog window 123.2, of the desired rounding radius is required.

An icon 124.1 (9/1 of the icon group in FIG. 3) and a dialog window 125.2 relate to a function "Copying". This function provides for drawing of a selectable number of images from a given element or segment and for lining up these images along a designated straight line extending from the element or the segment at selectable equal distances. The user can select whether the images should be real or virtual. In the later case, the image is simply stored so that separate copies in the "Geometry" cannot be modified.

An icon 126.1 (9/2 of the icon group in FIG. 3) and a dialog window 127.2 relate to a function "Mirroring". This function enables mirroring of a given element or a segment at a selectable point parallel to an X- or Y-axis that passes through the mirror center, or on a selectable straight line. These possibilities can be combined so that one or more new elements or segments can be set up.

Below, with reference to FIG. 11, an eighth group of functions and corresponding icons and dialog windows related to the Geometry module 1 will be described.

An icon 130.1 (9/3 of the icon group in FIG. 3) and a dialog window 131.2 relate to a function "Scaling". This function enables scaling of a given element or segment relative to a selectable center, that is enlarge or to contract within selectable coefficient in X- and/or Y-direction. To this end, identification is required of the element to be scaled and a first point of this element, input of both scaling coefficients into one of the input fields 33 of the dialog window 131.2, and either identification of a second point of the element to be scaled that corresponds to the first point, or input of coordinates of the second point in one of the input fields 33 of the dialog window 131.2.

An icon 132.1 (9/4 of the icon group in FIG. 3) and a dialog window 133.2 relate to a function "Rotation". This function enables rotation of a given element or segment about a given or fictitious point so that one or more rotational angles can be freely determined. The initial element remains stationary and a new element is set up. The set up of a new element can be real or virtual.

An icon 134.1 (9/5 of the icon group in FIG. 3) and a dialog window 135.2 relate to a function "Shift". This function enables shifting of a given element or segment to a given fictitious point so that the initial element disappears. To this end, identification of the target point or input of its coordinates in the input field 33 of the dialog window 135.2 is required.

An icon 136.1 (10/1 of the icon group in FIG. 3) and a dialog window 137.2 relate to a function "Auxiliary Profile". This function provides for drawing an auxiliary profile to a given cut profile and which, with a complete cut, is used as an analog.

Below, with reference to FIG. 12, a ninth group of functions and corresponding icons and dialog windows related to the Geometry module 1 will be described.

An icon 140.1 (11/2 of the icon group in FIG. 3) and a dialog window 141.2 relate to a function "Blending in/Extraction". This function enables to extract and again blend in any geometrical element or a portion thereof for improving the clarity of an image on the screen. Extraction is effected from point to point or from a point to the end of a displayed surface. At that, the extracted elements are not cleared.

An icon 142.1 (11/3 of the icon group in FIG. 3) and a dialog window 143.2 relate to a function "Macro". A "Macro" is a parameter object (also called a templet). When parameters are assigned numerical values, the drawing in the graphic region changes.

An icon 144.1 (11/4 of the icon group in FIG. 3) and a dialog window 145.2 relate to a function "Sub-Geometry". This function enables the user to read in the already defined geometry into an actual geometry program. To this end, the user selects a desired sub-geometry and identifies the zero point of coordinates of this sub-geometry with a given or fictitious point of the active (target-) geometry. Then this sub-geometry is manipulated with the functions "Rotation", "Scaling", or "Mirroring".

The user can collect frequently occurring patterns into a separate geometry library, which patterns can then be used as building blocks for a more complex geometry.

An icon 146.1 (11/5 of the icon group in FIG. 3) and a dialog window 147.2 relate to a function "Sketching". This function provides for a more rapid input of simple profiles. With this program, after selection of an icon "Point Setting" in the dialog window 147.2, a point is set with the mouse, and, after a further selection of an icon "Connection of a Straight Line" 149.1 in the dialog window 147.2, a straight line or, after selection of a third icon "Connection of a Circular Line" 150.1 in the dialog window 147.2, a circular line is connected with the point. Other icons and the input field 33 in the dialog window 147.2 serve for dimensioning.

Figure 13A:
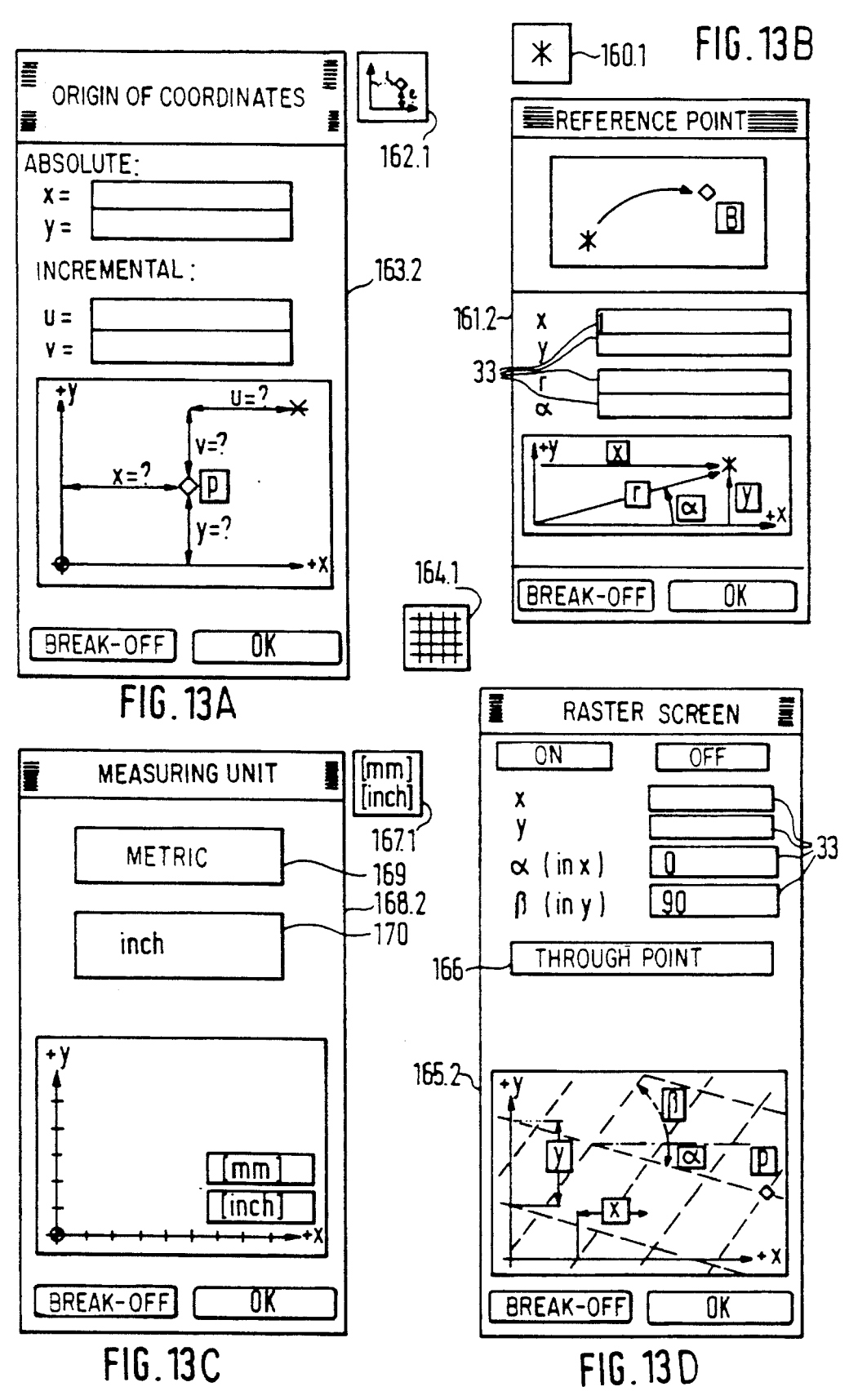

Now, with reference to FIG. 13, a tenth group of functions and corresponding icons and dialog windows related to the Geometry module 1 will be described.

An icon 160.1 (12/1 of the icon group in FIG. 3) and a dialog window 161.2 relate to a function "Feference Point". This function enables deletion of a given point by its identification, or a fictitious point, by inputting its coordinates (cartesian or polar) into the input field 33 of the dialog window 161.2 as a new reference point.

An icon 162.1 (12/3 of the icon group in FIG. 3) and a dialog window 163.2 relate to a function "Origin of Coordinates". This function serves for determining relation of absolute coordinates of an identified point and its incremental coordinates, when an incremental measurement takes place, to a reference point.

An icon 164.1 (12/4 of the icon group in FIG. 3) and a dialog window 165.2 relate to a function "Raster". This function enables drawing of a raster in which a first family of lines extending parallel to each other at a same distance, intersects a second family of lines extending parallel to each other at a same distance. To this end, input of respective distances of the first and second families of lines, and respective inclination angles of both families of lines to the X-axis is required. The user can arbitrarily define the related values and input them into the input field 33 in the dialog window 165.2. The raster, by selection of the of the option 166 "Through Point" in the dialog window 165.2 and subsequent identification with a given point, can be so displaced that the given point overlaps the intersection point of the raster. The user can turn the raster off and on, as desired. Besides, the user has a possibility to change the color, line type, and the line density of the raster.

An icon 167.1 (12/5 of the icon group in FIG. 3) and a dialog window 168.2 relate to a function "Measurement Unit". This function enables, with selection of corresponding options 169 and 170 in the dialog window 168.2, shifting from "metric" measurement to "inch" measurement and vice versa.

Figure 14:
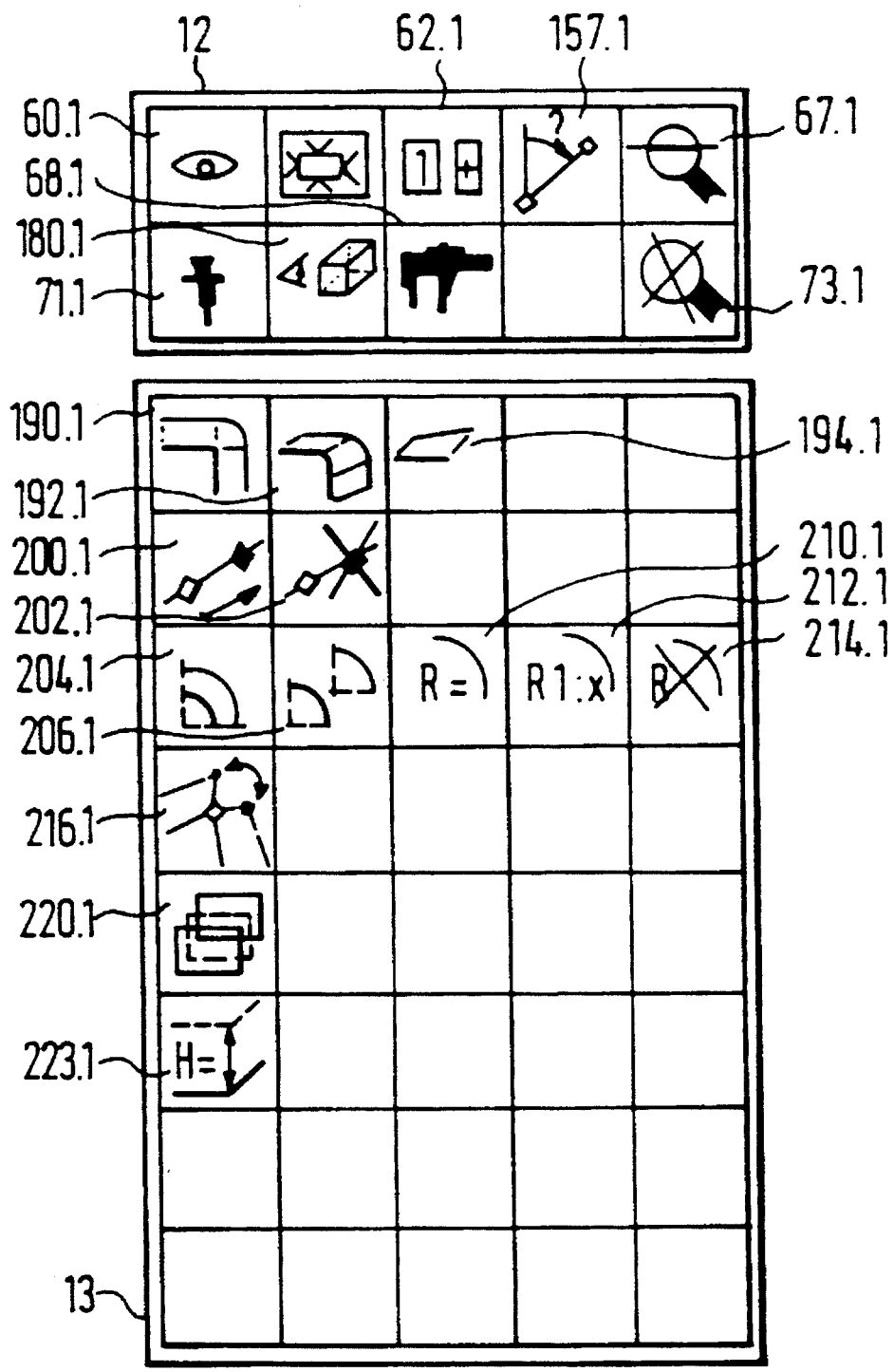
FIG. 14 shows an icon group of the angular Conic of the second, Conic module.
Figure 15:
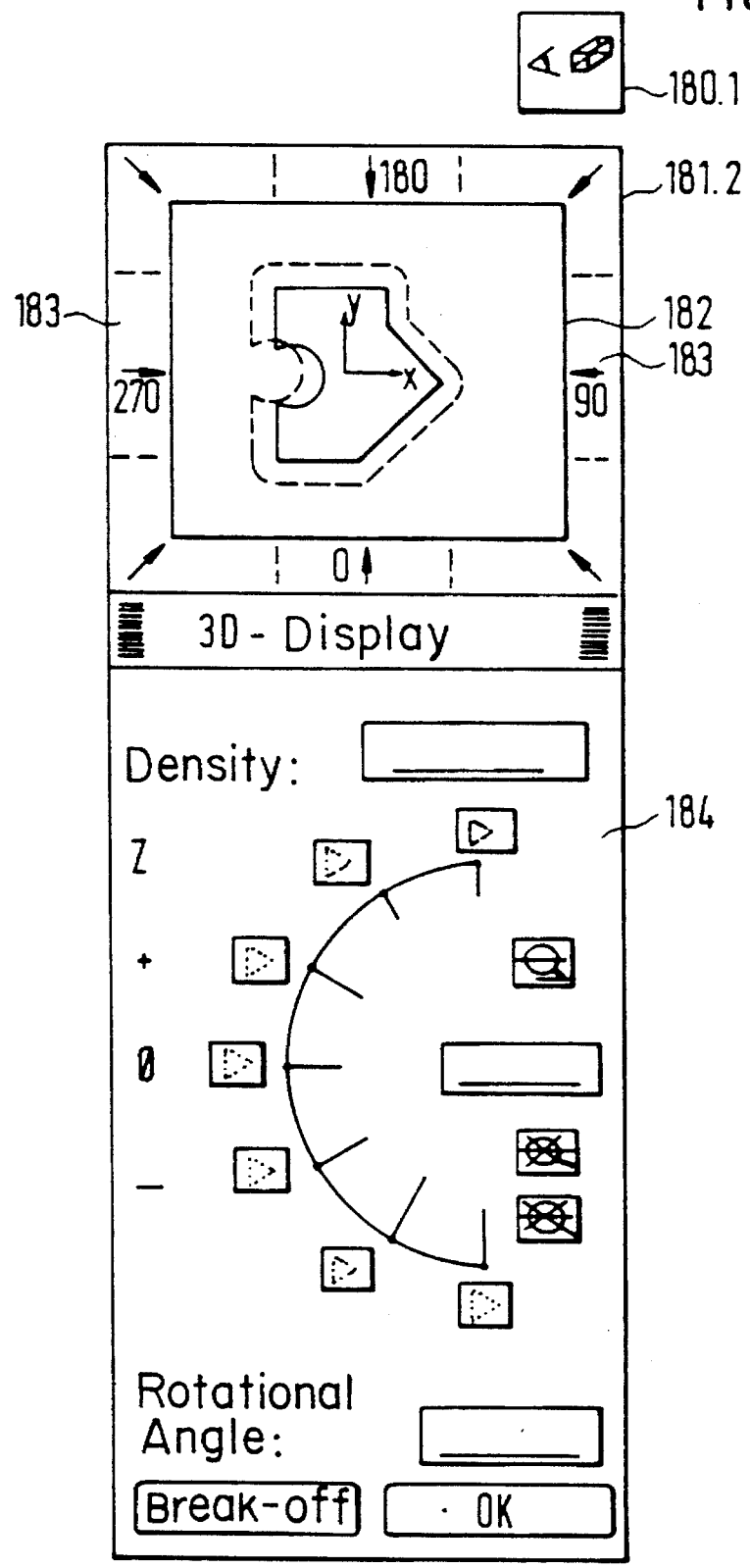
FIG. 15 shows a set of icons and corresponding dialog windows related to a first group of functions of the angular Conic.
Figure 17A:
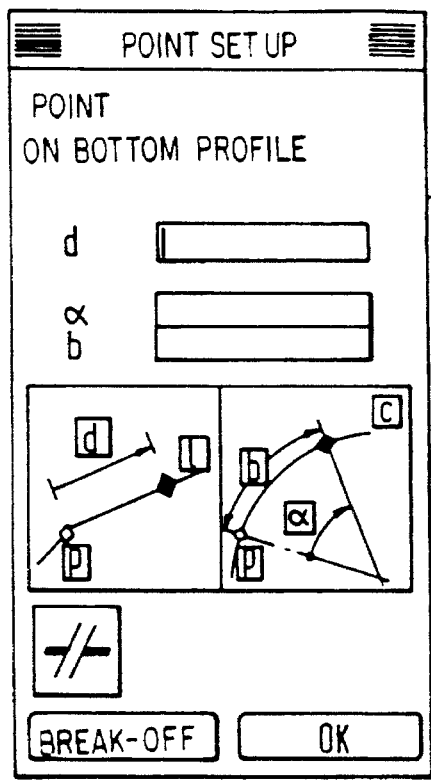
FIG. 17 shows a set of icons and corresponding dialog windows related to a third group of functions of the angular Conic.
Figure 17B:
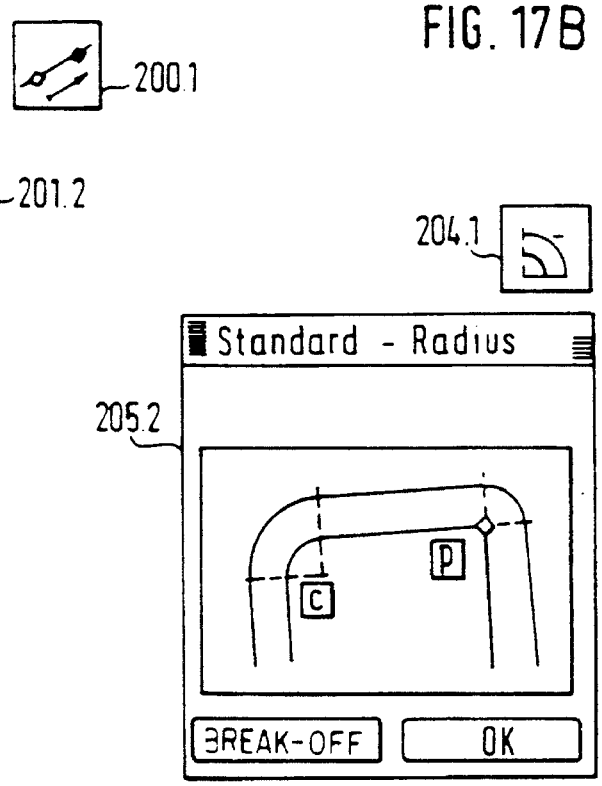
Figure 17C:
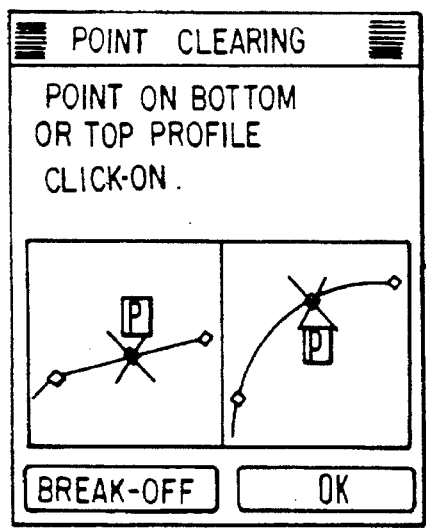
Figure 17D:
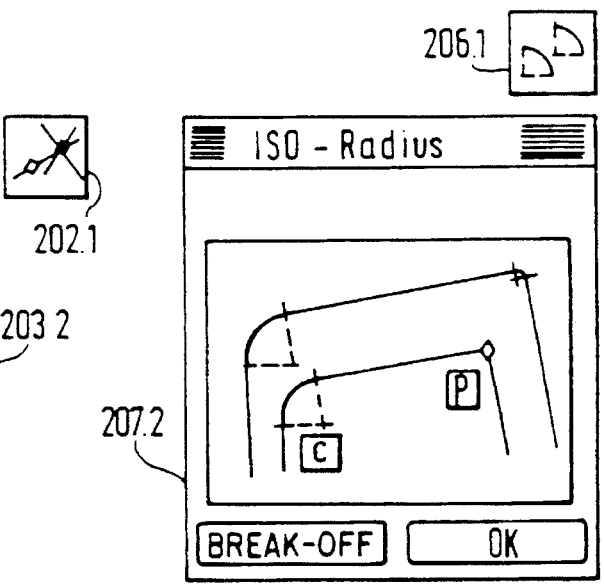

After call on of the angular Conic 3 of the Conic module 2, an icon group for the angular Conic 3 as shown in FIG. 14 appears in the function selection or the function setting region 12, 13 on the right side of the screen. The two first lines 12 of this icon group have the same icons as the corresponding lines 12 in the icon group for the Geometry module 1 (FIG. 31 except line/column 1/4 and 2/2. A first function related to the angular Conic 3 will be described with reference to FIG. 15.

An icon 180.1 (2/2 of the icon group in FIG. 14) and a dialog window 181.2 relate to a function "Three-Dimensional Display". This function enables to display an actual workpiece as quasi-three-dimensional. The user can prescribe "from where over" and "from which distance" the user will "look at the workpiece". For orientation, the workpiece is shown in a first sketch field 182 schematically, and significance of different orders with respect to a relative rotational angle of the workpiece is shown in the compass field 183. By using a second sketch field 184., in which different signal directions ("from completely up" to "from completely down") are prescribed to the workpiece, the user can define how to proceed. To this end, selection or input of the sight direction with regard to the height, input of a density value, and input of the rotational angle with regard to the compass field 183 is needed. Here, the zooming function can be used every time. Together with the three-dimensional setting of the workpiece, an X/Y/Z system of coordinates, whose "spacial" orientation corresponds to the selected sight direction, also appears on the screen.

A second group of functions and corresponding icons and dialog windows specifically related to the angular Conic 3 will be now described with reference to FIG. 16.

An icon 190.1 (3/1 of the icon group in FIG. 14) and a dialog window 191.2 relate to a function "Standard Conic". This function provides for input of angle and distance values, at that only such values which define the excursion of the wire electrode in the moving direction in the plane that extends perpendicular to the profile. A radius of a circular arc on an outer profile to be drawn is given in accordance with the norms for a normal cone.

An icon 192.1 (3/2 of the icon group in FIG. 14) and a dialog window 193.2 relate to a function "Set Angle". This function provides for setting of wire electrode inclination relative to the plane of the bottom profile for active or identified elements. A radius of a circular of an outer profile to be drawn is given in accordance with ISO norm for a radius.

An icon 194.1 (3/3 of the icon group in FIG. 14) and a dialog window 195.2 relate to a function "Linear Angle". This function provides for setting of an attack angle or wire spacing at the initial point A and an end point E of a particular section. The length of the active element of the bottom profile linearly changes the angle. Upon clicking of the initial (start) point, the apparatus verifies whether in this point a certain deviation from an adjacent element occurs. The foregoing also applies to the end point.

A third group of special function and corresponding icons and dialog windows related to the angular Conic 3 of the Conic module 2 will be described with reference to FIG. 17.

An icon 200.1 (4/1 of the icon group in FIG. 14) and a dialog window 201.2 relate to a function "Point Set up". This function enables the user to define, in the bottom profile, a point by its distance from a given point. The apparatus thereby provides a new defined point on the bottom profile and sets up a corresponding point on the top profile.

An icon 202.1 (4/2 of the icon group in FIG. 14) and a dialog window 203.2 relate to a function "Point Clearing". This function enables clearing of the same points of the bottom and top profiles which were set by the function "Point Set up", while the geometrical points are not cleared by this function. The two above-described functions "Point Set up" and "Point Clearing" are available in the Conic module 2, icons 200.1 and 202.1 and dialog windows 201.2 and 203.1, as for setting angular Conic 3 so for setting the three-dimensional Conic 4. In addition, these functions are available in the Operational Program module 5 where only those points can be cleared that were set in the Operational Program module 5.

An icon 204.1 (5/1 of the icon group in FIG. 14) and a dialog window 205.2 relate to a function "Standard Radius". This function provides for setting radii of circular arcs of the top profile in in accordance with a standard radius definition. This function provides for setting a radius R on the basis of a given radius r of the bottom profile, a given height h of the workpiece, and a defined attack angle aw of the wire electrode to a normal to the plane of the bottom profile, according to a formula $$r+h*tg(aw);$$

This function has a higher priority with regard to the functions "Standard Conic", "Set Angle" and "Linear Angle".

An icon 206.1 (5/2 of the icon group in FIG. 14) and a dialog window 207.2 relate to a function "ISO-radius. This function provides for setting radii of circular arcs of the top profile in accordance with ISO definition of a radius. Actually, a circular arc of a respective top profile has the same radius as the corresponding circular arc of the bottom profile. This function also has a higher priority with regard to the functions "Set Angle" and "Linear Angle".

A fourth group of special functions and correponding icons and dialog windows related to the angular Conic 3 in the Conic module 2 will be discussed with reference to FIG. 18.

An icon 210.1 (5/3 of the icon group in FIG. 14) and a dialog window 211.2 relate to a function "Programmable Radius". This function enables the user to input into the input field 33 of the dialog window 211.2 a to-be-drawn radius of a circular arc of the top profile. Whether the programmed radius can be edited may be established with a (later discussed) function "Simulation. This function likewise has a higher priority than the functions "Standard Conic", "Set Angle" and "Linear Angle".

An icon 212.1 (5/4 of the icon field in FIG. 14) and a dialog window 213.2 relate to a function "Ratio Radius". This function enables the user to set up a to-be-drawn radius of the top profile as an X-multiple of a corresponding given radius of the bottom profile with the desired X-factor being input by the user into the input field 33 of the dialog window 213.2. Here also this function has a higher priority than the functions "Standard Conic", "Set Angle" and "Linear Angle".

An icon 214.1 (6/5 of the icon group in FIG. 14) and a dialog window 215.2 relate to a function "Clearing Radius Definition". This function enables the user to cancel the already set radius definition. The clearing can be either global or local.

An icon 216.1 (6/1 of the icon group in FIG. 14) and a dialog window 217.2 relate to a function "Intermediate Record". With this function different wire electrode deviations are defined by means two adjacent lines in the bottom profile, and two different wire inclinations with respect to a common point of these two lines may exist. Thus, a break on the top profile may occur. The apparatus is able to recognize this, and it draws automatically a line (intermediate record) in the top profile that closes the break. This connecting line in the top profile is preset as a simple straight line between the two break ends. The function "Intermediate Record" enables the user to draw complex connection lines. If the user selects an intermediate record "Elongation" in an option field 218 in the dialog window 217.2, the apparatus shifts the two not yet adjacent elements in the top profile, in accordance with their form, further until they meet. If the user selects an intermediate record "Radius" in the option field 218, the apparatus connects both break edges, e.g., with a circular arc. If the user selects an intermediate record "Splines" in the option field 218, the apparatus connects both break edges, e.g., with a separate line. Actually, a tangential transition occurs.

Figure 19A:
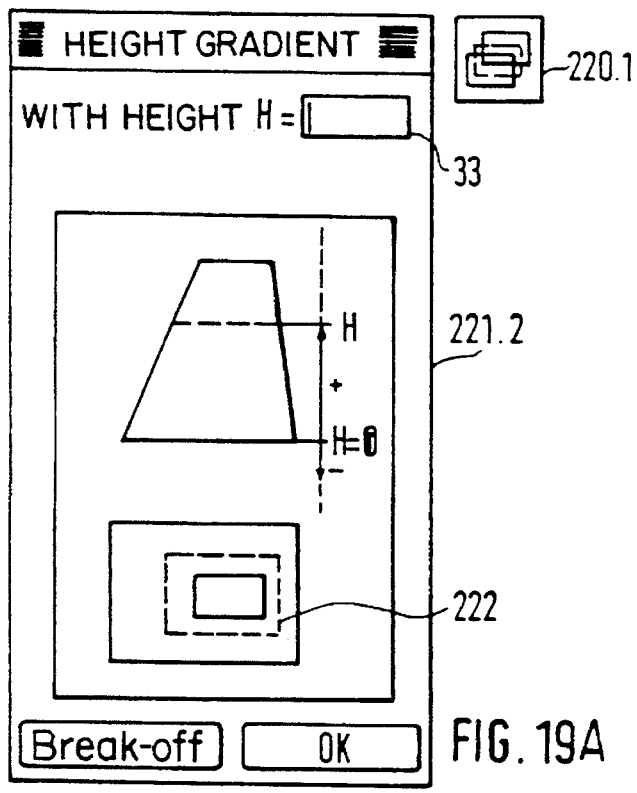
FIG. 19 shows a set of icons and corresponding dialog windows related to a fifth group of functions of the angular Conic.
Figure 19B:
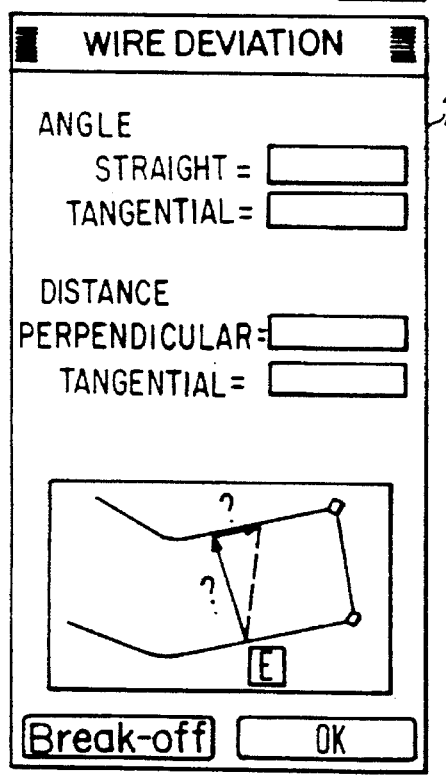
Figure 19C:
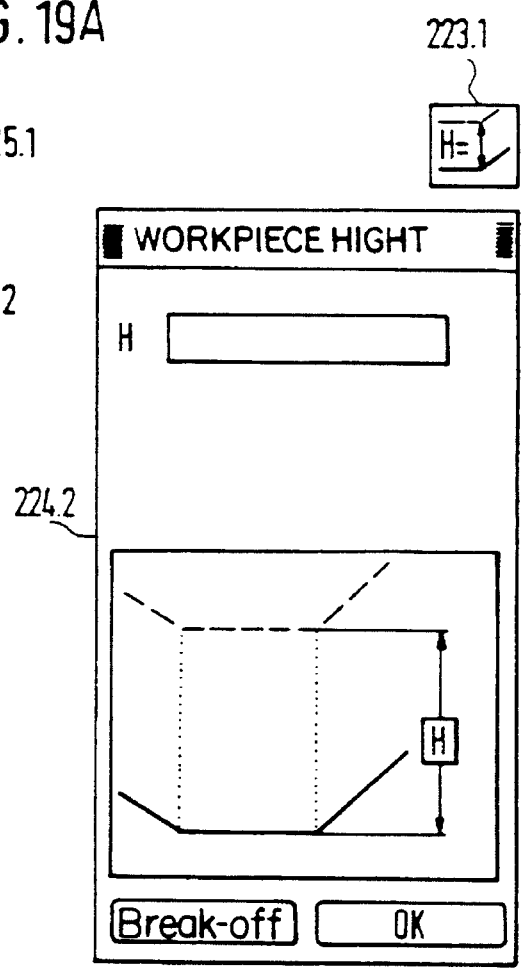

A fifth group of functions and corresponding icons and dialog windows related to the angular Conic 3 of the Conic module 2 will be discussed with reference to FIG. 19.

An icon 220.1 (7/1 of the icon group in FIG. 14) and a dialog window 221.2 relate to a function "Height Gradient". With this function, the user can set up a height line 222 of the workpiece. To this end, the user must input the desired height (in the direction of the Z-axis) into the input field 33 of the dialog window 221.2. (Height "0" is assigned to the plane of the bottom profile).

An icon 223.1 (8/1 of the icon group in FIG. 14) and a dialog window 224.2 relate to a function "Workpiece Height". This function serves for inputting a workpiece height (this height can be defined as a distance between two parallel profile planes).

An icon 225.1 (1/4 of the icon group in FIG. 14) and a dialog window 226.2 relate to a function "Wire Electrode Deviation". This function serves for indicating wire electrode deviation in a clicked point of the bottom or top profile.

The three last functions, as the functions "Point Set up" and "Point Clearing", are available in the Conic module 2 through corresponding icons 220.1, 223.1 and 225.1 and dialog windows 221.2, 224.2 and 226.2 as for set up of the angular Conic 3 so for set up of the three-dimensional Conic 4.

Figure 20:
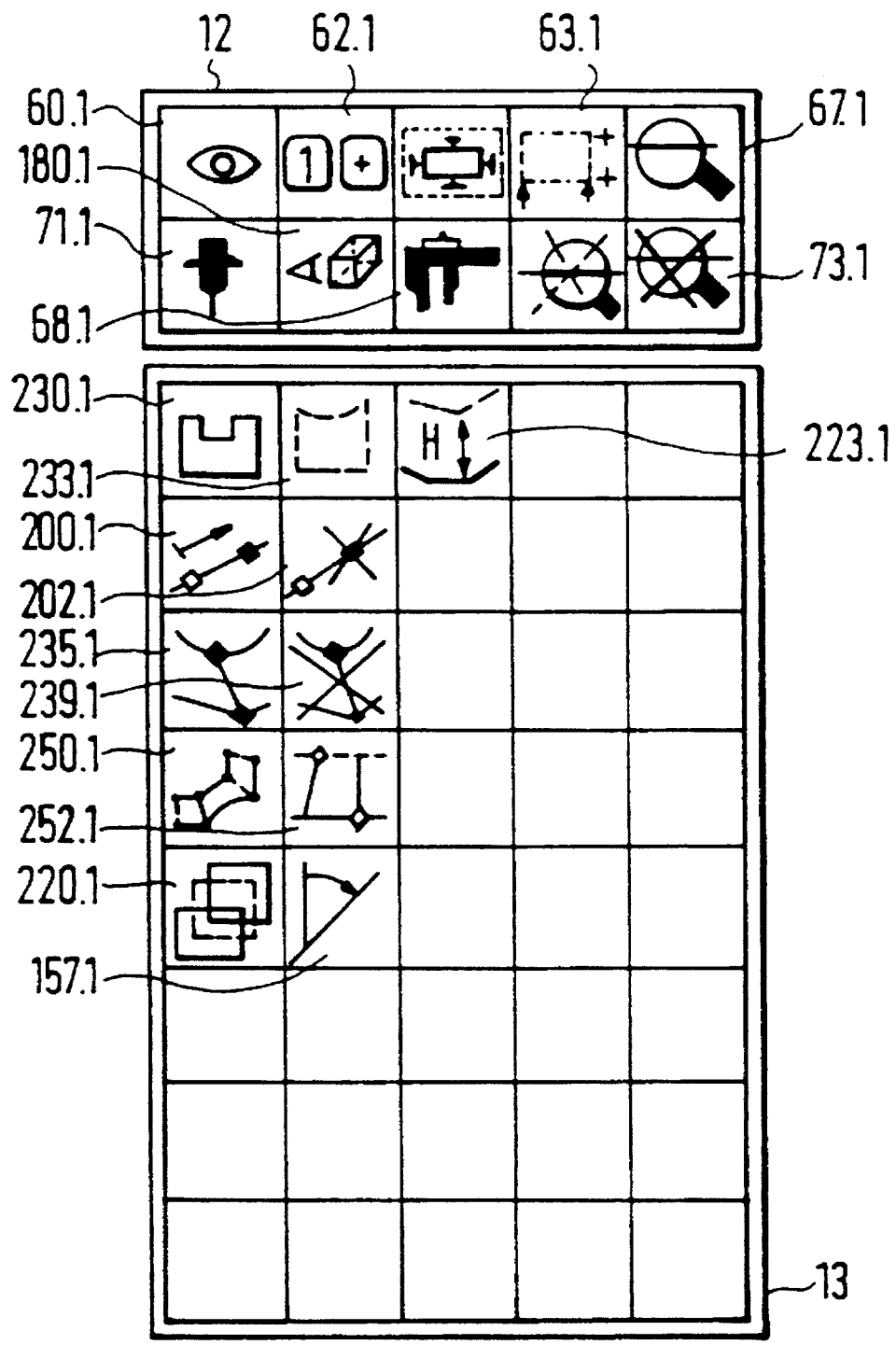
FIG. 20 shows an icon group of the three-dimensional Conic of the second, Conic module.
Figures 21A, 21B, 21C, 21D:
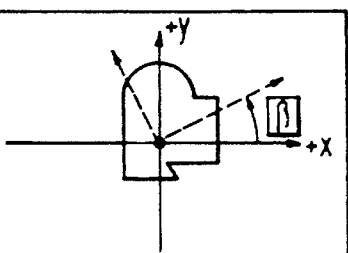
FIG. 21 shows a set of icons and corresponding dialog windows of a first group of functions of the three-dimensional Conic.

Upon selection of the three-dimensional Conic 4 of the Conic module 2, an icon group for the three-dimensional Conic 4 as shown in FIG. 20, appears in the icon field 12,13 on the right side of the screen. A first group of special functions and corresponding icons and dialog windows will be described with reference to FIG. 21.

An icon 230.1 (3/1 of the icon field in FIG. 20) relates to a function "Bottom Profile Read in". Upon selection of the icon 230.1, a set up bottom profile can be selected or read in by means of a data selection window. Then, the apparatus opens a background window 231.2 of the data selection window. The window 231.2 is associated with a function "Bottom Profile Positioning". This function enables centering of the read in profile with respect to the zero point of its coordinates. The user can turn the bottom profile a predetermined angle about the zero point of the coordinates and/or, by selecting a corresponding option 232, mirror it onto the X-axis.

An icon 233.1 (3/2 of the icon group in FIG. 3) relates to a function "Top Profile Read in". Upon selection of the icon 233.1, a set up top profile can be selected or read in by means of the data selection window. Then, the apparatus opens a background window 234.2 of the data selection window. The window 234.2 is associated with a function "Top Profile Positioning". This function is similar to the above-discussed function "Bottom Profile Positioning". In addition, the function "Top Profile Positioning" permits shifting of the top profile incrementally relative to the bottom profile.

An icon 235.1 (5/1 of the icon group in FIG. 20) and a dialog window 236.2 relate to a function "Milestone Set up". This function serves for allocation of a point on the bottom profile to a point on the top profile. This allocation is effected by identification of respective points of the bottom profile and the top profile. After each subsequent identification, a respective check box 237 is checked and a corresponding symbol box 238 is indicated as occupied.

An icon 239.1 (5/2 of the icon group in FIG. 20) and a dialog window 240.2 relate to a function "Milestone Clearing". This function cancels a given point-to-point allocation by identifying the allocation.

Figure 22A:
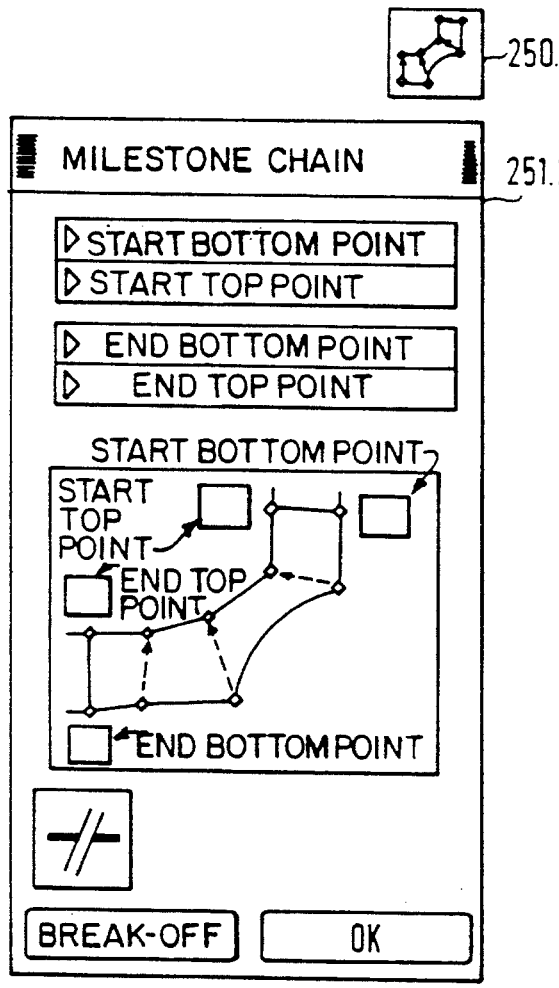
FIG. 22 shows a set of icons and corresponding dialog windows of a second group of functions of the three-dimensional Conic.
Figure 22B:
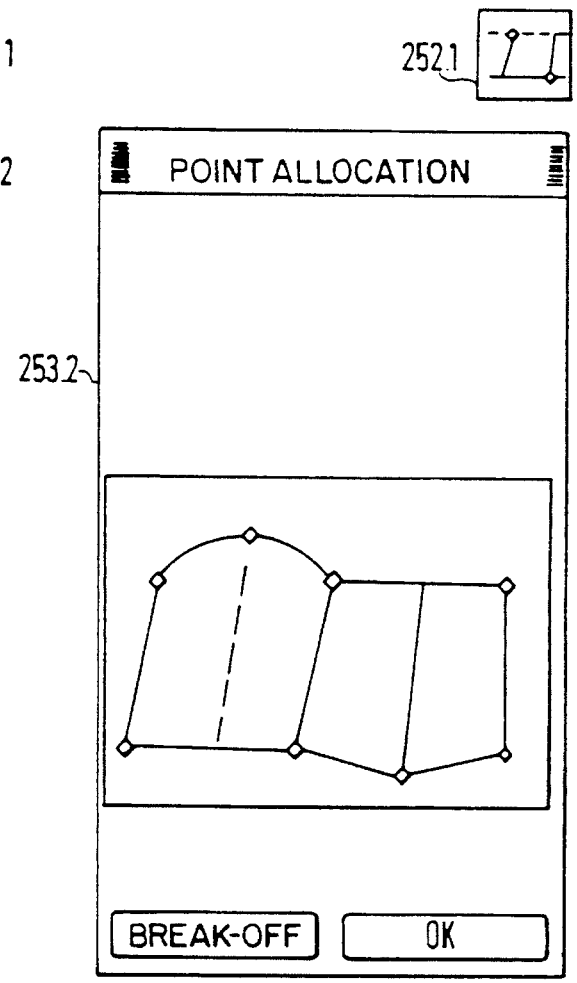

Now, with reference to FIG. 22, a second group of functions and corresponding icons and dialog windows related to the three-dimensional Conic 4 of the Conic module 2 will be described.

An icon 250.1 (6/1 of the icon group in FIG. 20) and a dialog window 251.2 relate to a function "Milestone Chain". This function generates a plurality of milestones, that is a chain of point-to-point allocations inside a set up profile section.

An icon 252.1 (6/2 of the icon group in FIG. 20) and a dialog window 253.2 relate to a function "Point Allocation". This function arranges all profile-defining points on the bottom or top profile which do not have a "partner" on the respective other profile, though there should be one. They are brought by linear apportion of the profile between existing milestones. Thus, all so-called "wire lines" of the workpiece will be shown.

Figure 23:
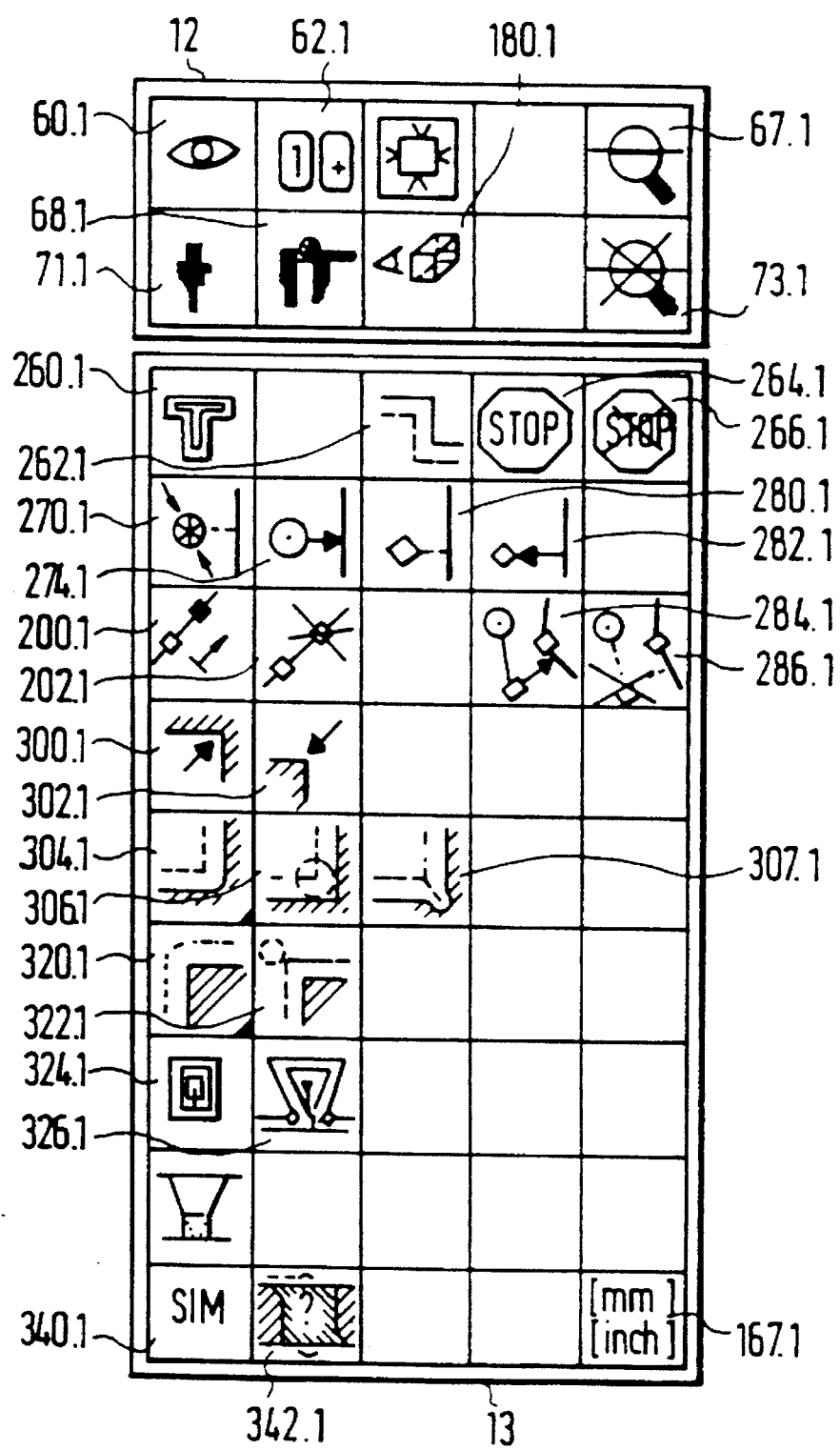
FIG. 23 shows an icon group of a third, Operational Program module.
Figure 25A:
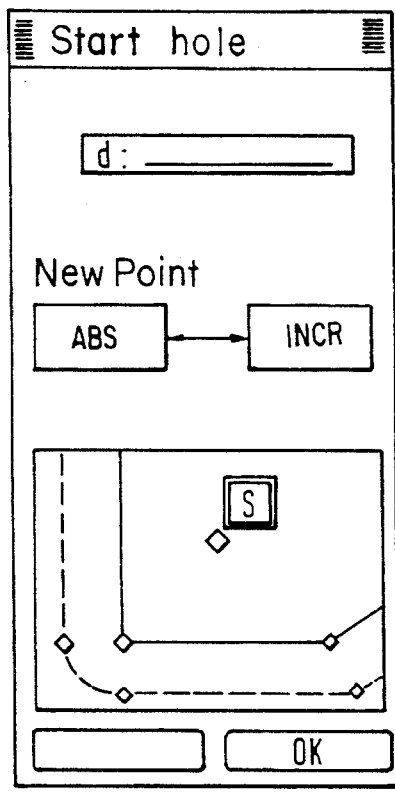
FIG. 25 shows a set of icons and corresponding dialog windows related to a second group of functions of the Operational Program module.
Figure 25B:
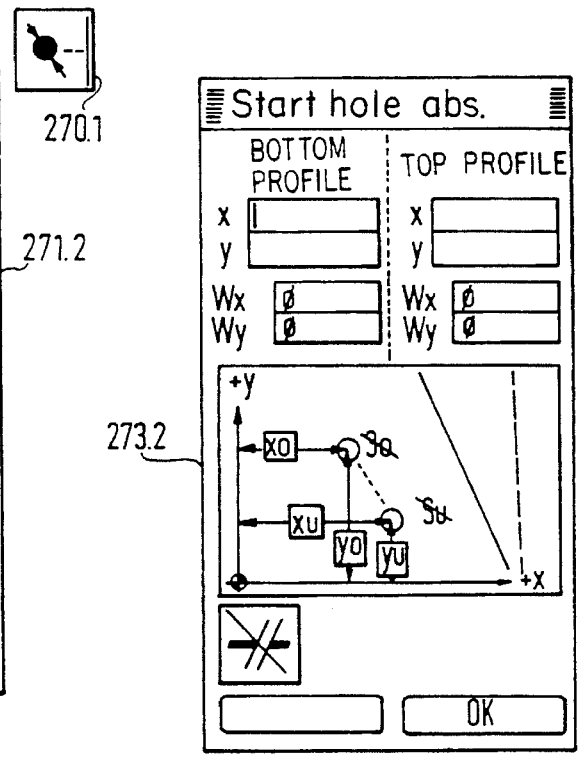
Figure 25C:
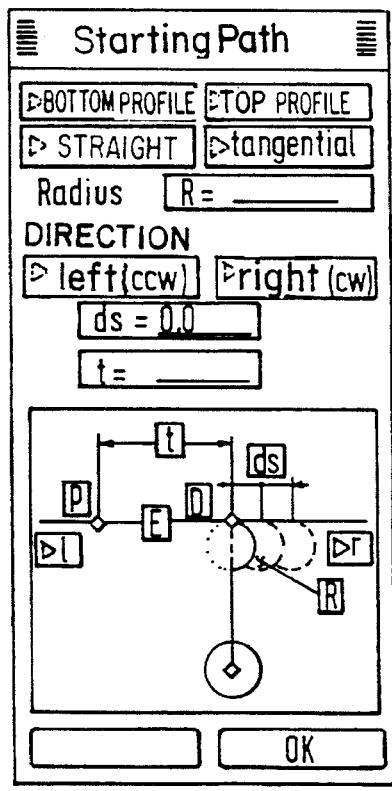
Figure 25D:
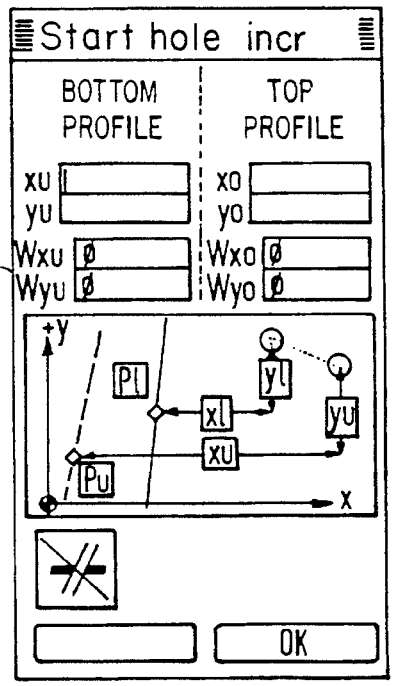
Figure 26A:
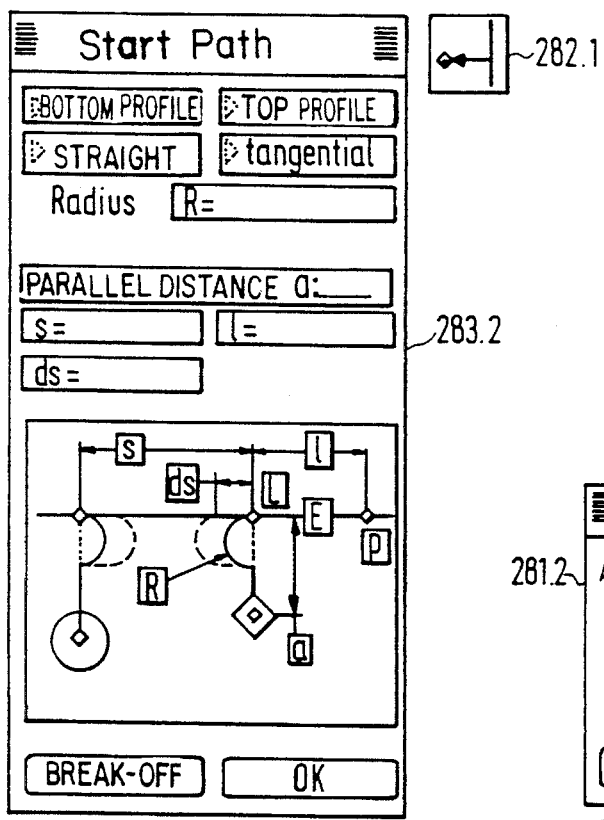
FIG. 26 shows a set of icons and corresponding dialog windows related to a third group of functions of the Operational Program module.
Figure 26B:
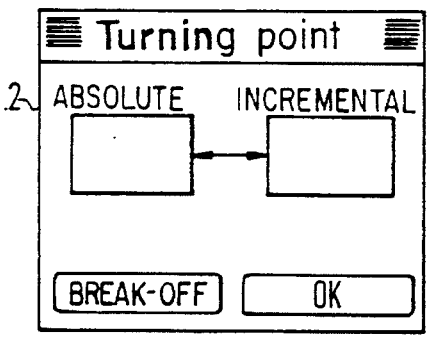
Figure 26C:
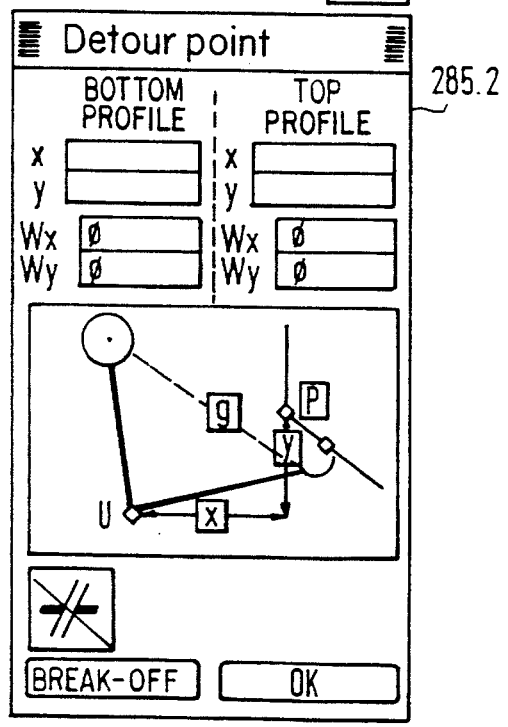
Figure 26D:
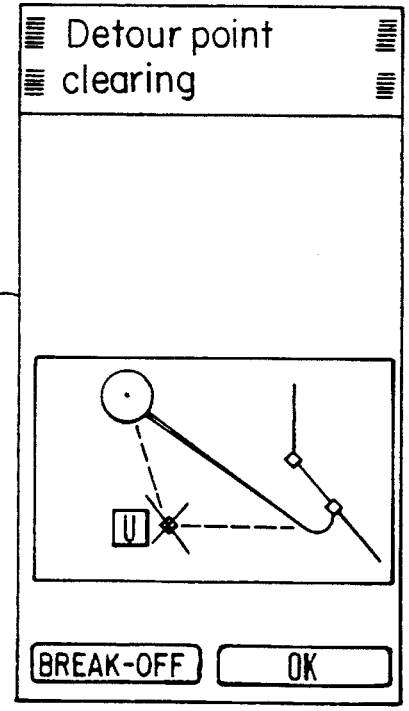
Figure 27A:
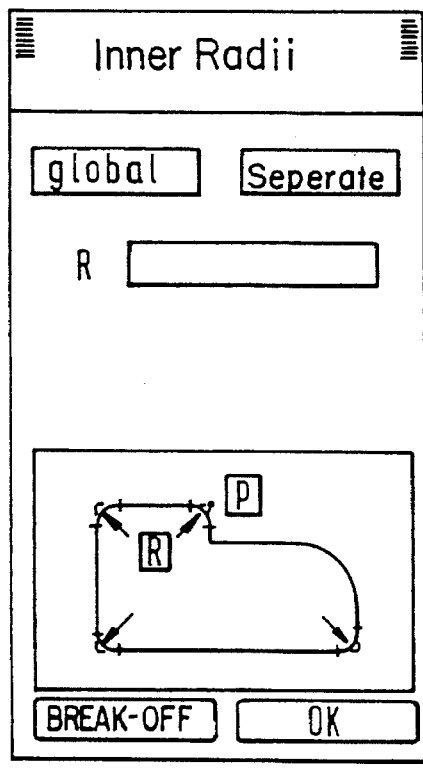
FIG. 27 shows a set of icons and corresponding dialog windows related to a fourth group of functions of the Operational Program module.
Figure 27B:
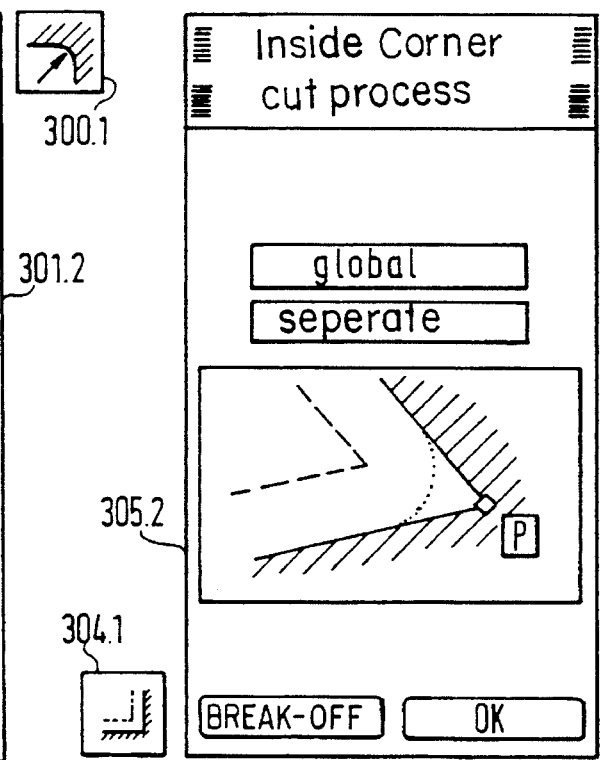
Figure 27C:
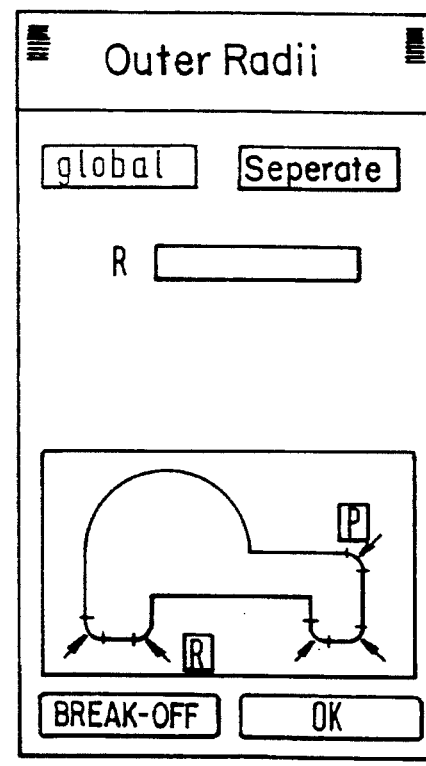
Figure 27D:
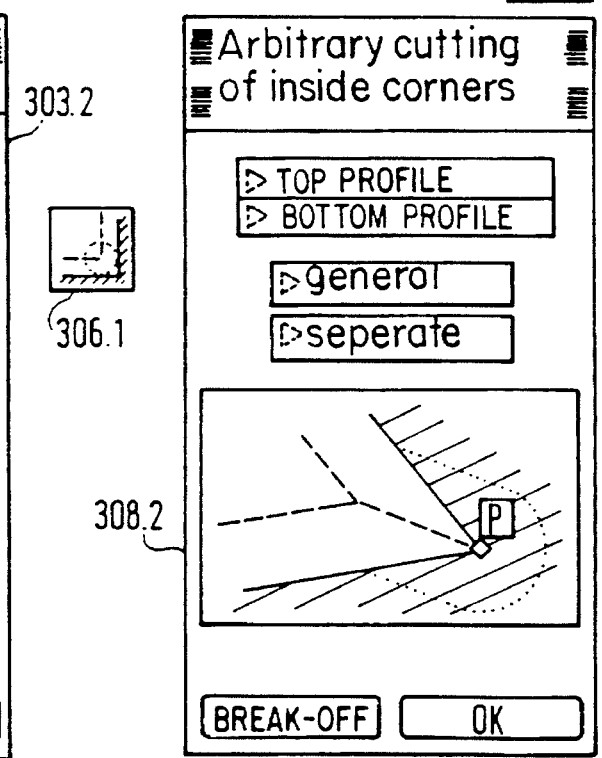
Figure 28A:
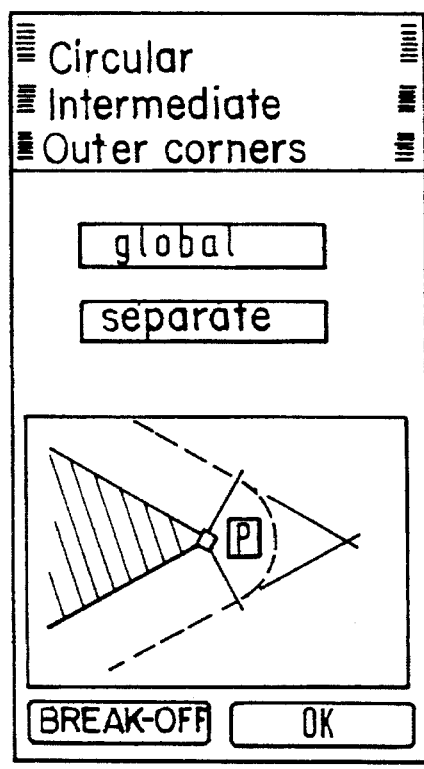
FIG. 28 shows a set of icons and corresponding dialog windows related to a fifth group of functions of the Operational Program module.
Figure 28B:
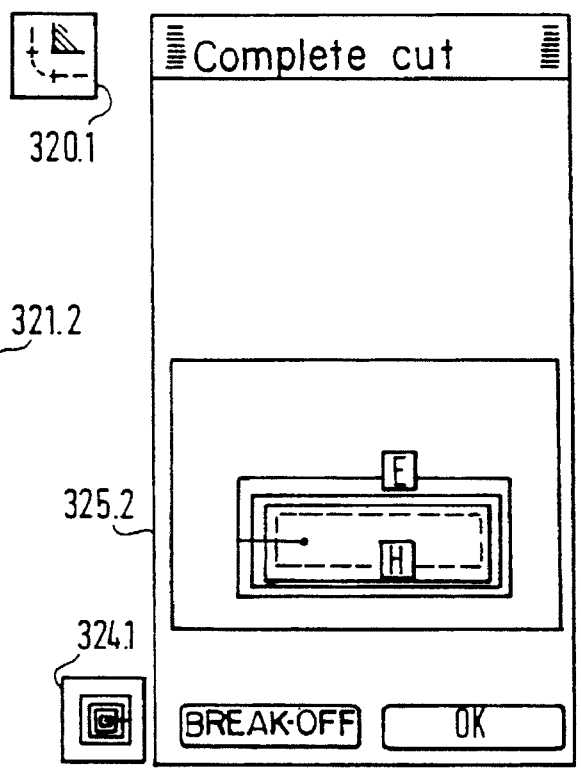
Figure 28C:
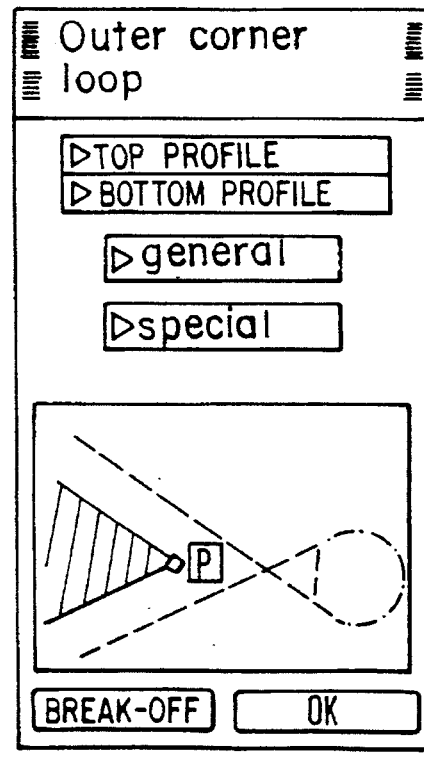
Figure 28D:
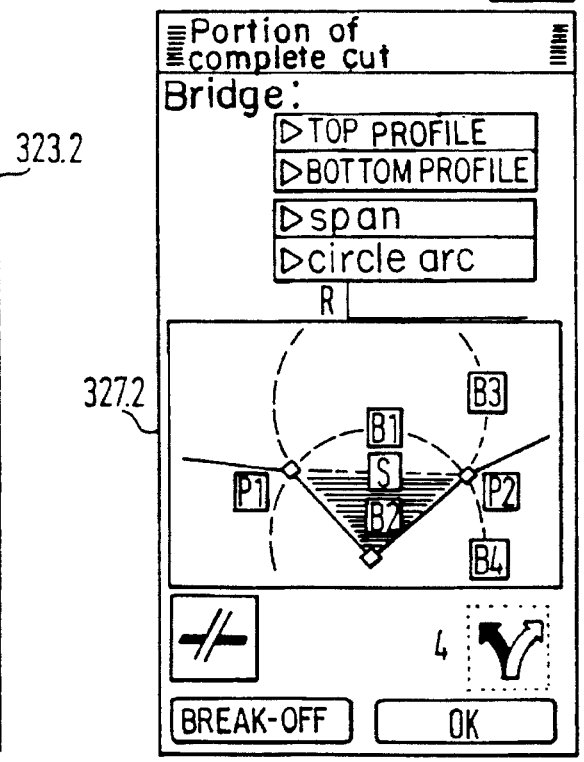

Upon passing into the Operation Program module 5 and selection of an appropriate Conic, a main window 10 appears on the screen for the Operation module 5. In the graphic region of the main window 10, the selected conic (top and bottom profiles) with all point-to-point allocations (wire lines) between the top and bottom profiles is displayed. An icon group for the Operation Program module 5 according to FIG. 23 appears in the icon field 12, 13 at the right side of the screen.

Below, with reference to FIG. 24, a first group of functions and corresponding icons and dialog windows related to the Opera Program module 5 will be described.

An icon 260.1 (3/1 of the icon group in FIG. 23) and a dialo window 261.2 relate to a function "Technology". This function enables the user to determine the number of desired cuts and related deviation values and decide whether these data should apply to the whole workpiece or only a portion thereof. In the later case, the definition of the portion is effected by identification of related elements on the top or the bottom profile.

An icon 262.1 (3/3 of the icon group in FIG. 23) and a dialog window 263.2 relate to a function "Additional Offset". This function enables definition of an additional surface deviation in a positive or negative direction for a particular additional machining of the whole top surface of the workpiece or a portion of the top surface. In the later case, the definition of the portion is effected by identification of related element(s) on the top or bottom profile.

An icon 264.1 (3/4 of the icon group in FIG. 23) and a dialog window relate to a function "STOP". This function enables the user to set up stop points on the profile while the user identifies the related points and defines them with respect to the main cut and additional cuts. At the point "STOP", the machine stops and proceeds with further machining only after a command to this effect has been given by the operator. (The STOP function permits the number of subprograms in the ISO code to be kept low. STOP points are set up as asterisks on the bottom and top profiles).

An icon 266.1 (3/5 of the icon group in FIG. 23) and a dialog window 267.2 relate to a function "STOP Clearing". With this function, the STOPS are cleared by simple clicking.

Now, with reference to FIG. 25, a second group of functions and corresponding icons and dialog windows related to the Operation Program module 5 will be described.

An icon 270.1 (4/1 of the icon group in FIG. 23) and a dialog window 271.2 relate to a function "Start Hole". With this function, the position and the diameter of the start hole is determined. At that, the apparatus prevents input of errors as it verifies whether the given point lies outside of a cutting male die or, with a cutting female die, inside of the profile. The position of the start hole is determined by identification of or input of incremental or absolute coordinates. In the later case, the apparatus opens a background window 272.2 "Start Hole Incr." or a background window 273.2 "Start Hole Abs.".

An icon 274.1 (4/2 of the icon group in FIG. 23) and a dialog window 275.2 relate to a function "Start Path". This function is selectable only after the start hole has been defined. With this function, the apparatus generates a start path start hole/workpiece in accordance with the criteria set forth by the user (along a straight path, tangential, radius, clockwise or counterclockwise, and so forth . . . ).

A third group of functions and corresponding icons and dialog windows related to the Operation Program module 5 will be described below with reference to FIG. 26.

An icon 280.1 (4/3 of the icon group in FIG. 23) and a dialog window 281.2 relate to a function "Turn Point". This function permits definition of "reverse points" absolutely or incrementally. To this end, the apparatus opens a respective window "Reverse Point Abs." or "Reverse Point Incr.".

An icon 282.1 (4/4 of the icon group in FIG. 23) and a dialog window 283.2 relate to a function "Exit Path". This function can essentially be considered as a "reverse" function of the "Start Path" function.

An icon 284.1 (5/4 of the icon group in FIG. 23) and a dialog window 285.2 relate to a function "Detour Point". This function defines a "Detour" of the path at a point indicated by the user.

An icon 286.1 (5/5 of the icon group in FIG. 23) and a dialog window 287.2 relate to a function "Detour Point Clearing". With this function, by clicking (identification), a given detour point in the start path is cleared.

A fourth group of functions and corresponding icons and dialog windows related to Operation Program module 5 will be described with reference to FIG. 27.

An icon 300.1 (6/1 of the icon group in FIG. 23) and a dialog window 301.2 relate to a function "Inner Radii". This function enables the user to round inside corners of the profile, and enables abandonment of so-called lighter workability based on supposedly optimal corner details. (At that, it should be noted that with wire electrode machining, inside "corners" always have a radius dependent on the the wire electrode diameter and an operational gap).

An icon 302.1 (6/2 of the icon group in FIG. 23) and a dialog window 303.2 relate to a function "Outer Radii". This function enables the user to round outer radii of a profile.

An icon 304.1 (7/1 of the icon group in FIG. 23) and a dialog window 305.2 relate to a function "Inside Corner Cut Process". This function is called in automatically to avoid undercutting.

An icon 306.1 (7/2 of the icon group in FIG. 23) relates to a function "Inside Corner Circumvention". This function provides for matching of corner radii with respective cuts (main and additional).

An icon 307.1 (7/3 of the icon group in FIG. 23) and a dialog window 308.2 relate to a function "Arbitrary Cutting of Inside Corners".

A fifth group of functions and corresponding icons and dialog windows related to the Operation Program module 5 will be described with reference to FIG. 28.

An icon 320.1 (8/1 of the icon group in FIG. 23) and a dialog window 321.2 relate to a function "Circular Intermediate Outer Corners". When not otherwise defined, this function is called in automatically. This function is preset (default).

An icon 322.1 (8/2 of the icon group in FIG. 23) and a dialog window 323.2 relate to a function "Outer Corner Loop". Upon call-in of this function and, if necessary, identification of a corner point of the top or bottom profile, the apparatus generates (one) corner loop in the wire displacement path.

An icon 324.1 (9/1 of the icon group in FIG. 23) and a dialog window 325.2 relate to a function "Complete Cut". This function serves for defining, in accordance with a predetermined track width, a predetermined distance of separate cut paths, and a predetermined addition, a complete cut by identification of an element on the top or bottom profile and, if necessary, one or more auxiliary profiles.

An icon 326.1 (9/2 of the icon group in FIG. 23) and a dialog window 327.2 relate to a function "Portion of a Complete Cut". This function serves for making a notch between two respective points of the top and bottom profiles in the workpiece during the complete cut.

Figure 29:
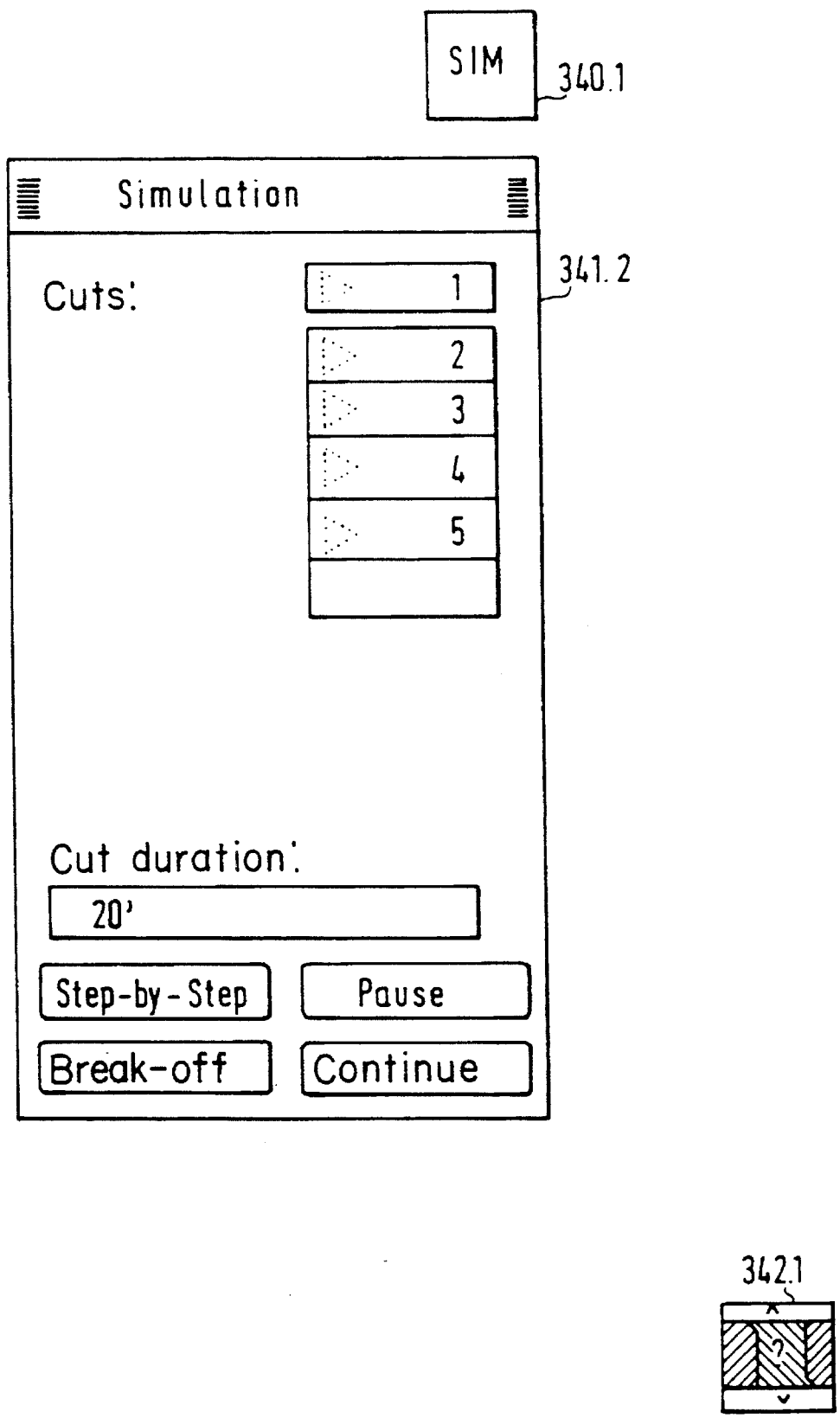
FIG. 29 shows a set of icons and corresponding dialog windows related to a sixth group of functions of the Operational Program module.

A sixth group of functions and corresponding icons and dialog windows related to the Operation Program module 5 will be described with reference to FIG. 29.

An icon 340.1 (11/1 of the icon group in FIG. 23) and a dialog window 341.2 relate to a function "Simulation". With this function, an exact graphic representation of all strategies and techniques defined in the Operation Program module 5 is triggered to verify their effect. The apparatus shows the programmed top and bottom profiles, inner and outer radii, start hole, start and exit paths with available detour points. The apparatus further shows and calculates the path (with actual wire electrode deviations), taking into account the selected corner strategy (loop, arbitrary cut, circumvention, etc...). All this occurs one after another for the (complete) main cut and following separate additional cuts, whereby the setting of respective sequential cuts, which correspond to the scaled available drawings and are distinguishable by color, are added. With the function "Zooming", separate deviation paths can be made clearly visible.

An icon 342.1 (11/2 of the icon group in FIG. 23) relates to a function "Separation". With this function, the apparatus verifies whether two paths obtained during the cutting process can be separated, that is whether the "Core of the Shell" can be removed, and generates, if necessary, a solution strategy (e.g., a complete cut or a bridge cut).

Figure 30:
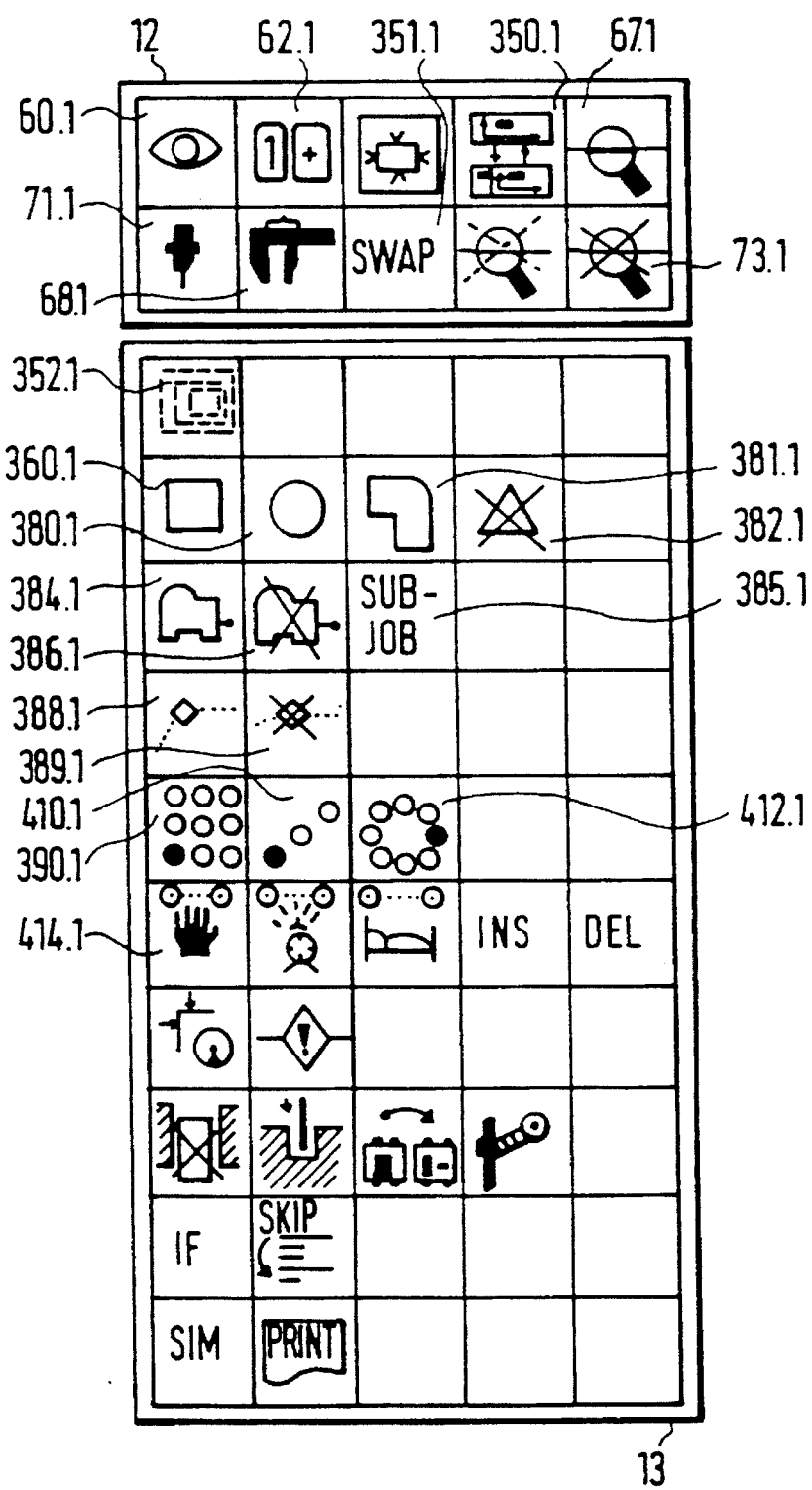
FIG. 30 shows an icon group of a fourth, Job module.
Figure 32A:
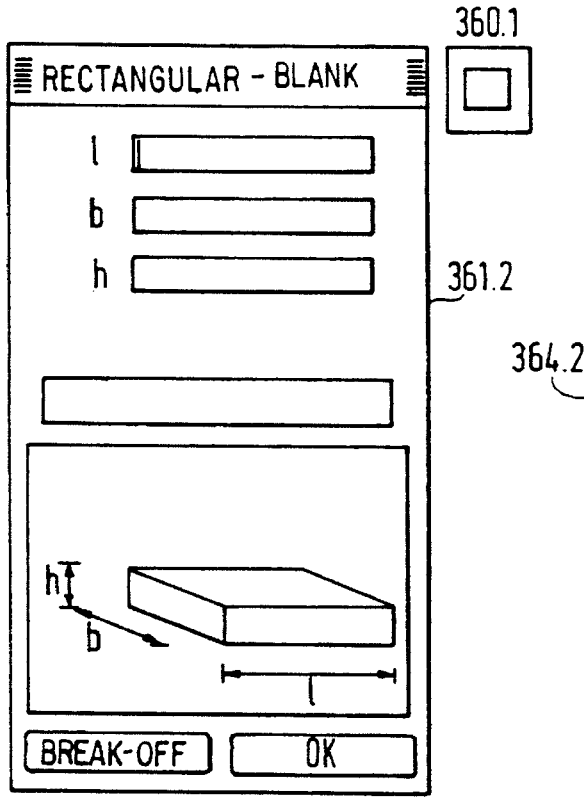
FIG. 32 shows a set of icons and corresponding dialog windows related to a second group of functions of the Job module.
Figure 32B:
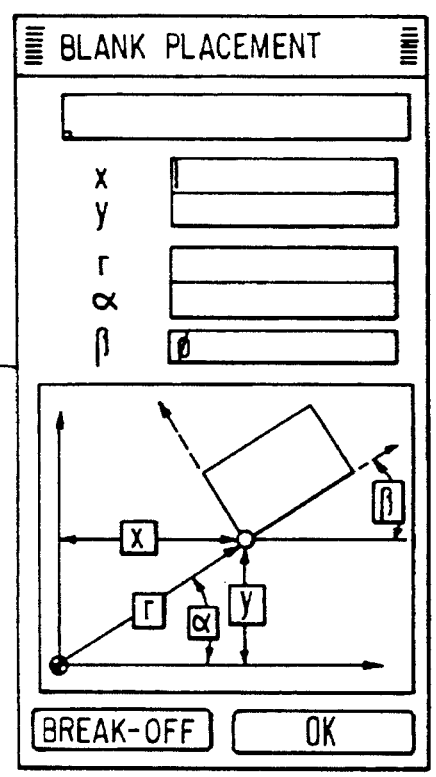
Figure 32C:
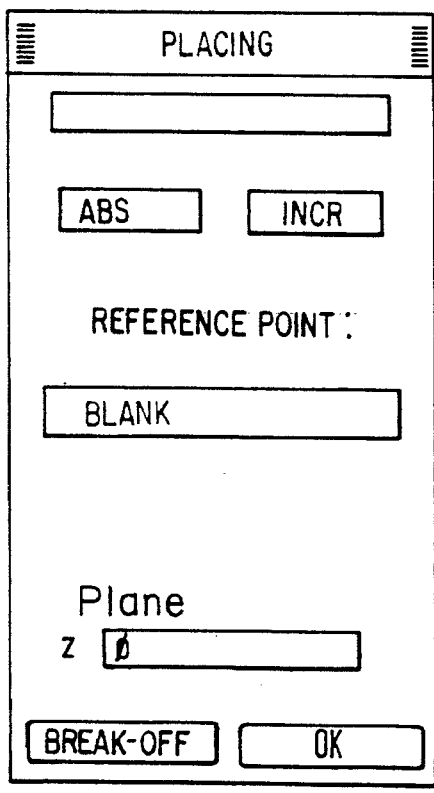
Figure 32D:
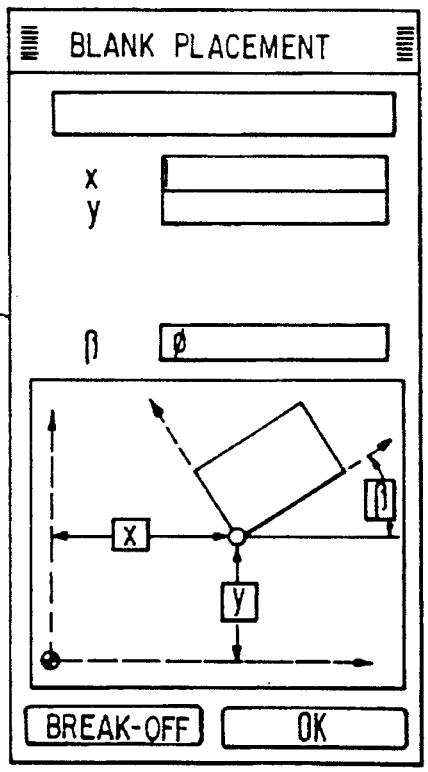

After selection of the Job program module 6, respective data file, an icon group according to FIG. 30, appears in both icon fields 12 and 13 on the right side of the screen. Now, with reference to FIG. 31, a first group of functions and corresponding icons and dialog windows related to the Job program module will be described.

An icon 350.1 (1/4 of the icon group in FIG. 30) relates to a function "Switch". With this function, the user can show a sequence group on the left next to the graphic.

An icon 351.1 (2/3 of the icon group in FIG. 30) relates to a function "SWAP". This function permits the user to change the setting of a chain plane in the graphic region between graphic images.

An icon 352.1 (3/1 of the icon group in FIG. 30) relates to a function "Operation Limits". This function serves for showing limits of operational freedom (travel paths, area of support, and maximum workpiece measurement).

A second group of functions and corresponding icons and dialog windows related to the Job program module 6 will be described with reference to FIG. 32.

An icon 360.1 (4/1 of the icon group in FIG. 30) and a dialog window 361.2 relate to a function "Rectangle-Blank". This function serves for input of length, width and height of an utilized rectangular blank. After the input of these dimensions, the apparatus automatically opens a window box associated with the function "Placing" (absolute or incremental, identification of a reference point, plane selection). If the user finds all related instructions, the apparatus automatically opens one of two further windows "Blank Placing", one of which 363.2 relates to "absolute" placing and the other 364.2 to "incremental" placing. After input of desired coordinates and rotational angles, the blank rectangle is (graphically) placed.

A third group of functions and corresponding icons and dialog windows related to the Job Program module 6 will be described with reference to FIG. 33.

An icon 380.1 (4/2 of the icon group in FIG. 30) relates to a function "Circular Blank", and an icon 381.1 (4/3 of the icon group in FIG. 30) relates to a function "Special Blank". These two functions correspond operationally to the call-in mode of the window boxes of the previously described function "Rectangle—Blank". At that, for the function "Special Blank", a geometry file, which defines the special blank (semi-finished workpiece), is preset. An icon 382.1 (4/4 of the icon group in FIG. 30) and a dialog window 383.2 relate to a function "Blank Clearing".

An icon 384.1 (5/1 of the icon group in FIG. 30) relates to a function "Operational Program". With this function, an operational program can be placed, by means of different background windows (and thus shifted, turned, rotated or mirrored).

An icon 385.1 (5/3 of the icon group in FIG. 30) relates to a function "Subjob". This function permits placing of a job (and thus a given operational program—chain), by means of different background windows, in the same manner as with the function "Operational Program".

An icon 386.1 (5/2 of the icon group in FIG. 30) and a dialog window 387.2 relate to a function "Operational Program or Subjob Clearing".

An icon 388.1 (6/1 of the icon group in FIG. 30) relates to a function "Detour Point". With this function, a detour point can be placed by means of different background windows.

An icon 389.1 (6/2 of the icon group in FIG. 30) relates to a "Detour Point Clearing" function.

An icon 390.1 (7/1 of the icon group in FIG. 30) and a dialog window 391.2 relate to a function "Loop Two-Dimensional". With this function, an operational program or a job can be virtually copied several times in a two-dimensional raster.

A forth group of functions and corresponding icons and dialog windows related to the Job program modul 6 will be described with reference to FIG. 34.

An icon 410.1 (7/2 of the icon group in FIG. 30) and a dialog window 411.2 relate to a function "Loop One-Dimensional". With this function, an operational program or a job can be virtually copied several times in a one-dimensional raster.

An icon 412.1 (7/3 of the icon group in FIG. 30) and a dialog window 413.2 relate to a function "Loop in a Circle". With this function an operational program or job can be virtually planetary copied several times. The job or the operational program thereby can remain as revolving or parallel directional.

An icon 414.1 (8/1 of the icon group in FIG. 30) relates to a function "Manual Chaining". This function permits manual chaining of operatioanal programs.

While particular embodiments of the invention have been shown and described, various modifications thereof will be apparent to those skilled in the art and, therefore, it is not intended that the invention be limited to the disclosed embodiments or to the details thereof, and the departures may be made therefrom within the spirit and scope of the invention as set forth in the appended claims.

What is claimed is:

1. An apparatus for monitoring and programming functioning of a spark erosion machine for machining workpieces, said apparatus comprising a screen having window means including at least one of means for displaying a plurality of separate functions, means for selecting at least one function of the displayed plurality of functions, means for valuewise setting up the selected at least one function, and means for controlling selection and valuewise set up of the at least one function, wherein said window means includes a dialog window with at least one of a section for identification of a function, a section for input of set up of a function, and a section for sketching a function, wherein said input section comprises a display for reproducing valuewise set up parameters of a selected function and wherein said display is provided so as to reproduce a plurality of mutually exclusive values or value groups which distinguish from each other and permit to obtain a similar change of the selected function.

2. An apparatus as set forth in claim 1, and further comprising means for simultaneously preventing input of the mutually exclusive values or value groups.

3. An apparatus as set forth in claim 1, and further comprising means for subsequently preventing input of the mutually exclusive values or value groups.

4. An apparatus as set forth in claim 1, wherein said display includes means for indicating which of values or value groups has been just set up.

5. An apparatus as set forth in claim 1, wherein said display includes means for selecting the set up values or value groups.

6. An apparatus as set forth in claim 1, wherein said display comprises means for labelling values or value groups corresponding to a respective set up, said labelling means including illuminated display fields with one of symbols and signs for reproducing the set up parameters of the selected function.

7. An apparatus as set forth in claim 6, wherein said display fields are one of luminous contrast sections and color contrast sections.

8. An apparatus as set forth in claim 6, wherein said input and sketching sections have similar symbols and signs.

9. An apparatus as set forth in claim 8, wherein the symbols and signs are so connected with said display fields that the set up of the predetermined values or value groups is simultaneously displayed in said input and sketching sections.

10. An apparatus as set forth in claim 1, wherein said window means comprises a main window and at least two elements for breaking off a function input process and for transferring the function to said main window.

11. An apparatus as set forth in claim 10, wherein said window means includes a further element for interrupting the function input process, and storage means for storing values input before interruption.

12. An apparatus as set forth in claim 10, wherein said window means comprises means for requesting available construction alternatives.

13. An apparatus as set forth in claim 11, and further comprising means for calling in the stored values.

* * * * *